US012797276B2

(12) United States Patent
Boulos et al.

(10) Patent No.: US 12,797,276 B2
(45) Date of Patent: Nov. 17, 2026

(54) PATIENT POSITIONING SYSTEMS AND METHODS

(71) Applicant: Sage Products, LLC, Cary, IL (US)

(72) Inventors: Catherine Boulos, Cary, IL (US); Alex D. Kea, Cary, IL (US); Hester C. Fletcher, Cary, IL (US); David P. Beck, Cary, IL (US); Michael P. Flores, Cary, IL (US); Medha Sesham, Cary, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 17/683,212

(22) Filed: Feb. 28, 2022

(65) Prior Publication Data

US 2022/0323283 A1 Oct. 13, 2022

Related U.S. Application Data

(60) Provisional application No. 63/277,383, filed on Nov. 9, 2021, provisional application No. 63/240,539, filed (Continued)

(51) Int. Cl.
*A61G 13/12* (2006.01)

(52) U.S. Cl.
CPC ....... *A61G 13/1265* (2013.01); *A61G 13/127* (2013.01); *A61G 13/1275* (2013.01); *A61G 13/128* (2013.01)

(58) Field of Classification Search
CPC .............. A61G 13/1265; A61G 13/127; A61G 13/1275; A61G 13/128; A61G 13/1285; A61G 7/1028; A61G 7/1021; A61G 7/05746; A61G 7/05753; A61G 7/05761; A61G 7/05769; A61G 7/05776; A61G 7/05784; A61G 7/05792; A61G 7/001; A61G 7/05715; A61G 13/126;

(Continued)

(56) References Cited

U.S. PATENT DOCUMENTS

| | | | |
|---|---|---|---|
| 542,720 | A | 7/1895 | Weiss |
| 674,451 | A | 5/1901 | Bunker |

(Continued)

FOREIGN PATENT DOCUMENTS

| | | | |
|---|---|---|---|
| AU | 2008256995 | A1 | 12/2008 |
| CA | D188671 | | 11/2020 |

(Continued)

OTHER PUBLICATIONS

Invitation to Pay Additional Fees for International Application No. PCT/US2022/018215, mailed Jun. 15, 2022, 12 pages.

(Continued)

*Primary Examiner* — Justin C Mikowski
*Assistant Examiner* — Deborah Talitha Gedeon
(74) *Attorney, Agent, or Firm* — Foley & Lardner LLP

(57) ABSTRACT

A method for reprocessing a patient positing system, the system comprising inflatable device and a high-friction pad configured to attach to the inflatable device. The method includes removing the high-friction pad from the inflatable device, at least one of cleaning or sterilizing the inflatable device, and providing a replacement for at least one component of the patient positioning system.

20 Claims, 12 Drawing Sheets

Related U.S. Application Data on Sep. 3, 2021, provisional application No. 63/173,171, filed on Apr. 9, 2021.

(58) Field of Classification Search
CPC .... A61G 13/129; A61G 7/1026; A47C 27/10; A47C 27/08; A47C 27/081; Y10S 5/922
USPC .......... 5/81.1 R, 646, 713, 81.1 HS; 128/878
See application file for complete search history.

(56) References Cited

U.S. PATENT DOCUMENTS 1,334,901 A 3/1920 Higdon
1,726,939 A 9/1929 Anderson
2,068,134 A 1/1937 Houghton
2,573,375 A 10/1951 Winstead
2,582,439 A 1/1952 Kavanagh
2,750,606 A 6/1956 Freedlander et al.
2,804,911 A 9/1957 Howarth
D195,020 S 4/1963 Emery
3,112,956 A 12/1963 Shick et al.
3,155,991 A 11/1964 Dunham
3,166,799 A 1/1965 Milton
3,178,732 A 4/1965 Stibitz
3,205,010 A 9/1965 Schick
3,325,832 A 6/1967 Malicki
3,333,286 A 8/1967 Biolik
3,452,372 A 7/1969 Emery
3,474,781 A 10/1969 Gaylord, Jr.
3,477,071 A 11/1969 Emerson
3,503,649 A 3/1970 Johnson
3,523,563 A 8/1970 Louis
3,536,117 A 10/1970 Huber
3,653,083 A 4/1972 Lapidus
3,778,851 A 12/1973 Howorth
3,785,395 A 1/1974 Andreasson
3,811,140 A 5/1974 Burpo
3,829,914 A 8/1974 Treat
3,933,154 A 1/1976 Cabansag
3,965,503 A 6/1976 Gridel
4,030,719 A 6/1977 Gabriele et al.
4,048,681 A 9/1977 Baulch et al.
4,066,072 A 1/1978 Cummins
4,073,021 A 2/1978 Carlisle
4,108,170 A 8/1978 Spann
4,132,228 A 1/1979 Green
4,214,326 A 7/1980 Spann
4,233,700 A 11/1980 Spann
4,247,963 A 2/1981 Reddi
4,272,856 A 6/1981 Wegener et al.
4,370,769 A 2/1983 Herzig et al.
4,389,742 A 6/1983 Dewitt
4,391,010 A 7/1983 Kronman
4,417,710 A 11/1983 Adair
4,425,676 A 1/1984 Crane
4,509,214 A 4/1985 Shea
4,517,690 A 5/1985 Wegener
4,528,704 A 7/1985 Wegener et al.
4,554,693 A 11/1985 Calloway
4,627,426 A 12/1986 Wegener et al.
4,627,796 A 12/1986 Moore
4,662,016 A 5/1987 Seeman
4,662,366 A 5/1987 Tari
4,675,925 A 6/1987 Littleton
4,686,719 A 8/1987 Johnson et al.
4,694,515 A 9/1987 Rogers, Jr.
4,802,249 A 2/1989 Bills
4,809,484 A 3/1989 Lovik
4,823,417 A 4/1989 Fukuichi
4,858,625 A 8/1989 Cramer
4,867,230 A 9/1989 Voss
D305,458 S 1/1990 Wang
4,905,712 A 3/1990 Bowlin et al.
4,908,895 A 3/1990 Walker
4,912,861 A 4/1990 Huang
4,944,053 A 7/1990 Smith
4,977,629 A 12/1990 Jones
5,012,821 A 5/1991 Tarver
5,016,650 A 5/1991 Marlar
5,022,110 A 6/1991 Stroh
5,056,533 A 10/1991 Solano
5,060,324 A 10/1991 Marinberg et al.
5,067,189 A 11/1991 Weedling et al.
5,070,559 A 12/1991 Pettifer
5,086,543 A 2/1992 Mitchell
5,088,747 A 2/1992 Morrison et al.
5,103,518 A 4/1992 Gilroy et al.
5,111,838 A 5/1992 Langston
5,123,699 A 6/1992 Warburton
5,138,731 A 8/1992 Harcrow, Jr.
5,142,720 A 9/1992 Kelso et al.
5,144,708 A 9/1992 Pekar
5,148,563 A 9/1992 Klearman et al.
D331,270 S 11/1992 Johnson et al.
5,168,589 A 12/1992 Stroh et al.
5,182,828 A 2/1993 Alivizatos
5,193,238 A 3/1993 Clute
5,199,121 A 4/1993 Payne
5,226,186 A 7/1993 Boyd
5,274,862 A 1/1994 Palmer et al.
5,280,657 A 1/1994 Stagg
5,329,655 A 7/1994 Garner
5,331,698 A 7/1994 Newkirk et al.
5,362,302 A 11/1994 Jensen et al.
5,369,829 A 12/1994 Jay
5,373,595 A 12/1994 Johnson et al.
5,390,384 A 2/1995 Dinsmoor et al.
D356,156 S 3/1995 Boland
5,395,162 A 3/1995 Jay et al.
5,398,678 A 3/1995 Gamow
5,426,801 A 6/1995 Klearman et al.
5,438,721 A 8/1995 Pahno et al.
5,447,235 A 9/1995 Pharo
5,448,790 A 9/1995 Saro et al.
5,451,179 A 9/1995 Laroi, Jr. et al.
5,452,487 A 9/1995 Leggett
5,476,105 A 12/1995 Toth
D369,054 S 4/1996 Straub et al.
D369,934 S 5/1996 Straub et al.
5,524,307 A 6/1996 Griffin
RE35,299 E 7/1996 Weedling et al.
5,549,121 A 8/1996 Vinci
5,561,873 A 10/1996 Weedling
5,603,591 A 2/1997 McLellan
RE35,468 E 3/1997 Newman
5,632,769 A 5/1997 Kappel et al.
5,634,224 A 6/1997 Stephen
5,671,977 A 9/1997 Jay et al.
D385,143 S 10/1997 Straub et al.
5,702,153 A 12/1997 Pliska
5,742,958 A 4/1998 Solazzo
5,787,523 A 8/1998 Lindberg
5,797,155 A 8/1998 Maier et al.
5,806,928 A 9/1998 Gattuso et al.
5,830,780 A 11/1998 Dennison et al.
5,836,027 A 11/1998 Leventhal et al.
5,836,654 A 11/1998 DeBellis et al.
5,957,491 A 9/1999 Cech et al.
5,997,491 A 12/1999 Harris
6,009,873 A 1/2000 Neviaser
6,012,183 A 1/2000 Brooke et al.
6,073,291 A 6/2000 Davis
6,082,824 A 7/2000 Chow
6,102,936 A 8/2000 Augustine et al.
6,108,861 A 8/2000 Vystrcil et al.
6,115,861 A 9/2000 Reeder et al.
6,145,143 A * 11/2000 Hicks ................. A61G 7/05784 5/691
6,154,900 A 12/2000 Shaw
6,159,172 A 12/2000 Gray et al.
6,223,368 B1 5/2001 Anslin
6,223,369 B1 5/2001 Maier et al.
6,240,584 B1 6/2001 Perez et al.
6,241,320 B1 6/2001 Chew et al.
6,241,755 B1 6/2001 Arnold et al.

(56) References Cited

U.S. PATENT DOCUMENTS

| | | | |
|---|---|---|---|
| 6,273,810 | B1 | 8/2001 | Rhodes et al. |
| 6,289,534 | B1 | 9/2001 | Hakamiun et al. |
| 6,317,909 | B1 | 11/2001 | Blum |
| 6,327,724 | B1 | 12/2001 | Sharrock et al. |
| 6,347,642 | B1 | 2/2002 | Schulte |
| 6,357,084 | B1 | 3/2002 | Haidon |
| 6,367,106 | B1 | 4/2002 | Gronsman |
| 6,374,435 | B1 | 4/2002 | Leininger et al. |
| 6,413,194 | B1 | 7/2002 | Gant |
| 6,415,466 | B1 | 7/2002 | Laiso |
| 6,427,268 | B1 | 8/2002 | Davis |
| 6,467,106 | B1 | 10/2002 | Heimbrock |
| 6,484,334 | B1 | 11/2002 | Borders et al. |
| 6,510,574 | B2 | 1/2003 | Sharrock et al. |
| 6,541,094 | B1 | 4/2003 | Landvik et al. |
| 6,543,068 | B1 | 4/2003 | Penninger |
| 6,560,793 | B2 | 5/2003 | Walker |
| 6,653,363 | B1 | 11/2003 | Tursi et al. |
| 6,658,676 | B1 | 12/2003 | Persson et al. |
| 6,666,426 | B1 | 12/2003 | Taylor |
| 6,698,041 | B2 | 3/2004 | VanSteenburg et al. |
| 6,701,544 | B2 | 3/2004 | Heimbrock |
| 6,701,558 | B2 | 3/2004 | Vansteenburg |
| 6,701,559 | B2 | 3/2004 | Boso et al. |
| 6,804,845 | B2 | 10/2004 | Stewart et al. |
| 6,820,292 | B2 | 11/2004 | Heimbrock |
| 6,874,176 | B2 | 4/2005 | Berge |
| 6,898,809 | B2 | 5/2005 | Davis |
| D508,182 | S | 8/2005 | Colonello |
| D509,270 | S | 9/2005 | Jason |
| 6,964,073 | B1 | 11/2005 | Curry |
| 6,966,275 | B2 | 11/2005 | Whitehill |
| 7,028,350 | B1 | 4/2006 | Davis |
| 7,032,261 | B2 | 4/2006 | Heimbrock |
| 7,040,706 | B2 | 5/2006 | Koffler |
| 7,074,166 | B2 | 7/2006 | Weitzman |
| 7,107,641 | B2 | 9/2006 | Davis |
| 7,114,204 | B2 | 10/2006 | Patrick |
| 7,131,154 | B2 | 11/2006 | Davis et al. |
| 7,168,115 | B2 | 1/2007 | Davis |
| 7,210,176 | B2 | 5/2007 | Weedling et al. |
| 7,225,486 | B2 | 6/2007 | Jackson |
| 7,240,384 | B2 | 7/2007 | Dudonis |
| 7,243,382 | B2 | 7/2007 | Weedling et al. |
| 7,266,852 | B2 | 9/2007 | Davis |
| D555,248 | S | 11/2007 | Rugfelt |
| 7,337,485 | B2 | 3/2008 | Metzger |
| 7,340,785 | B2 | 3/2008 | Weedling et al. |
| 7,373,680 | B2 | 5/2008 | Davis |
| 7,376,995 | B2 | 5/2008 | Davis |
| 7,406,723 | B2 | 8/2008 | Davis |
| 7,415,738 | B2 | 8/2008 | Weedling et al. |
| 7,467,431 | B2 | 12/2008 | Weedling et al. |
| 7,506,387 | B1 | 3/2009 | Scordato et al. |
| 7,565,709 | B2 | 7/2009 | Davis |
| 7,571,498 | B2 | 8/2009 | Jewell et al. |
| 7,574,761 | B2 | 8/2009 | Davis |
| 7,591,029 | B2 | 9/2009 | Weedling et al. |
| 7,627,910 | B2 | 12/2009 | Davis |
| 7,650,654 | B2 | 1/2010 | Lambarth et al. |
| D610,852 | S | 3/2010 | Rothschild et al. |
| 7,676,862 | B2 | 3/2010 | Poulos et al. |
| 7,681,262 | B2 | 3/2010 | Weedling et al. |
| D613,105 | S | 4/2010 | Chuang |
| 7,712,170 | B2 | 5/2010 | Davis |
| 7,731,282 | B2 | 6/2010 | Leeds |
| 7,731,283 | B2 | 6/2010 | Leeds |
| 7,735,164 | B1 | 6/2010 | Patrick |
| 7,739,758 | B2 | 6/2010 | Weedling et al. |
| 7,757,318 | B2 | 7/2010 | Poulos et al. |
| 7,784,132 | B2 | 8/2010 | Gonzalez et al. |
| 7,810,193 | B1 | 10/2010 | Ennis et al. |
| 7,900,299 | B2 | 3/2011 | Weedling et al. |
| 7,914,081 | B1 | 3/2011 | Smith |
| 7,914,611 | B2 | 3/2011 | Vrzalik et al. |
| 7,954,187 | B1 | 6/2011 | Earnest |
| 7,971,292 | B1 | 7/2011 | Sithian |
| 8,001,635 | B2 | 8/2011 | Humbles |
| 8,118,920 | B2 | 2/2012 | Vrzalik |
| 8,127,382 | B1 | 3/2012 | Plascencia et al. |
| 8,128,065 | B2 | 3/2012 | King et al. |
| 8,161,583 | B1 | 4/2012 | Palen |
| D663,428 | S | 7/2012 | Gã-Ransson et al. |
| 8,214,951 | B1 | 7/2012 | Batta |
| 8,234,727 | B2 | 8/2012 | Schreiber et al. |
| 8,276,222 | B1 | 10/2012 | Patrick |
| 8,302,222 | B2 | 11/2012 | Jasani |
| 8,353,069 | B1 | 1/2013 | Miller |
| 8,372,182 | B2 | 2/2013 | Vrzalik et al. |
| 8,387,177 | B2 | 3/2013 | Davis |
| 8,413,277 | B2 | 4/2013 | Davis et al. |
| 8,464,376 | B1 | 6/2013 | Waite |
| 8,464,720 | B1 | 6/2013 | Pigazzi et al. |
| 8,511,314 | B2 | 8/2013 | Pigazzi et al. |
| 8,539,621 | B2 | 9/2013 | West |
| 8,539,622 | B2 | 9/2013 | West |
| 8,539,623 | B2 | 9/2013 | West |
| 8,566,977 | B2 | 10/2013 | Davis |
| 8,590,574 | B2 | 11/2013 | Jian et al. |
| 8,601,623 | B1 | 12/2013 | West |
| 8,602,032 | B2 | 12/2013 | Goldsmith |
| 8,661,580 | B2 | 3/2014 | Giap |
| 8,678,418 | B1 | 3/2014 | Quarles |
| 8,782,830 | B2 | 7/2014 | Brykalski et al. |
| 8,789,533 | B2 | 7/2014 | Steffens et al. |
| D712,555 | S | 9/2014 | Berg |
| 8,850,634 | B2 | 10/2014 | Ponsi et al. |
| 8,918,930 | B2 | 12/2014 | Stroh et al. |
| 8,978,184 | B1 | 3/2015 | Garrett |
| 9,132,052 | B2 | 9/2015 | Fowler et al. |
| 9,161,876 | B2 | 10/2015 | Pigazzi et al. |
| 9,254,231 | B2 | 2/2016 | Vrzalik et al. |
| 9,271,588 | B1 | 3/2016 | Phillips et al. |
| 9,308,122 | B2 | 4/2016 | Dunlop |
| 9,321,392 | B1 | 4/2016 | Lebrun |
| 9,326,903 | B2 | 5/2016 | Locke |
| 9,332,850 | B2 | 5/2016 | Krishtul |
| 9,375,343 | B2 | 6/2016 | Marshall et al. |
| D767,148 | S | 9/2016 | Perreault |
| 9,522,078 | B2 | 12/2016 | Pizzini |
| 9,538,853 | B2 | 1/2017 | Vrzalik et al. |
| 9,554,956 | B2 | 1/2017 | Reiners et al. |
| D781,615 | S | 3/2017 | Parman |
| 9,675,509 | B2 | 6/2017 | Tilk et al. |
| 9,693,919 | B2 | 7/2017 | Berman |
| 9,693,920 | B2 | 7/2017 | Fowler et al. |
| 9,750,656 | B1 | 9/2017 | Pigazzi et al. |
| 9,782,287 | B2 | 10/2017 | Pigazzi et al. |
| 9,782,312 | B2 | 10/2017 | Brubaker et al. |
| 9,782,313 | B2 | 10/2017 | Hindson |
| 9,795,529 | B2 | 10/2017 | Lehtio |
| D802,223 | S | 11/2017 | Quantz |
| 9,835,344 | B2 | 12/2017 | Vrzalik et al. |
| 9,849,053 | B2 | 12/2017 | Rigoni et al. |
| D808,686 | S | 1/2018 | May et al. |
| 9,907,408 | B2 | 3/2018 | Vrzalik et al. |
| 9,931,262 | B2 | 4/2018 | Pigazzi et al. |
| 9,949,883 | B1 | 4/2018 | Pigazzi et al. |
| 9,962,122 | B2 | 5/2018 | Augustine et al. |
| 9,968,500 | B1 | 5/2018 | Amini et al. |
| 10,016,066 | B2 | 7/2018 | Howard |
| 10,034,808 | B2 | 7/2018 | Vrzalik et al. |
| 10,039,680 | B2 | 8/2018 | Galbraith |
| 10,045,902 | B1 | 8/2018 | Pigazzi et al. |
| 10,064,770 | B2 | 9/2018 | Reiners et al. |
| 10,092,470 | B2 | 10/2018 | Lewis |
| 10,098,800 | B2 | 10/2018 | Pigazzi et al. |
| 10,112,513 | B2 | 10/2018 | Patrick et al. |
| 10,159,533 | B2 | 12/2018 | Moll et al. |
| 10,172,470 | B1 | 1/2019 | Vrzalik et al. |
| 10,206,830 | B2 | 2/2019 | Fowler et al. |
| 10,285,888 | B2 | 5/2019 | Liu |
| 10,285,890 | B1 | 5/2019 | Pigazzi et al. |
| 10,314,417 | B2 | 6/2019 | Duck |

(56) References Cited

U.S. PATENT DOCUMENTS

| | | | |
|---|---|---|---|
| 10,322,050 | B1 | 6/2019 | Pigazzi et al. |
| 10,363,185 | B2 | 7/2019 | Purdy et al. |
| 10,363,188 | B2 | 7/2019 | Young |
| 10,376,430 | B2 | 8/2019 | Liu |
| 10,398,614 | B2 | 9/2019 | Rigoni et al. |
| 10,500,115 | B2 | 12/2019 | Weedling |
| 10,512,578 | B2 | 12/2019 | Visco |
| 10,561,522 | B2 | 2/2020 | Giap |
| 10,568,435 | B2 | 2/2020 | Luckemeyer et al. |
| 10,576,004 | B1 | 3/2020 | Frances |
| 10,588,800 | B2 | 3/2020 | Fletcher et al. |
| D880,901 | S | 4/2020 | Raad et al. |
| 10,709,626 | B1 | 7/2020 | Gomez |
| 10,716,724 | B2 | 7/2020 | Vrzalik et al. |
| D897,132 | S | 9/2020 | Mckinney |
| 10,765,576 | B2 | 9/2020 | Rigoni et al. |
| 10,765,580 | B1 | 9/2020 | Augustine |
| 10,772,778 | B2 | 9/2020 | Hahn et al. |
| 10,828,216 | B2 | 11/2020 | Phalen et al. |
| D907,777 | S | 1/2021 | Hahn et al. |
| 10,912,699 | B2 | 2/2021 | Pigazzi et al. |
| D911,748 | S | 3/2021 | Luo |
| 10,993,866 | B2 | 5/2021 | Augustine |
| 11,020,301 | B2 | 6/2021 | Messerschmidt |
| D934,591 | S | 11/2021 | Cuadra |
| 11,224,548 | B2 | 1/2022 | Depauw |
| 11,224,550 | B1 | 1/2022 | Gomez |
| 11,266,525 | B2 | 3/2022 | Kaforey et al. |
| 11,298,282 | B2 | 4/2022 | Davis et al. |
| 11,324,650 | B2 | 5/2022 | Zhou et al. |
| 11,364,166 | B2 | 6/2022 | Grindstaff et al. |
| 11,439,551 | B2 | 9/2022 | Davis et al. |
| 11,471,317 | B1 | 10/2022 | Spears |
| D970,257 | S | 11/2022 | Klerer |
| 11,484,431 | B2 | 11/2022 | Allen |
| 11,484,456 | B2 | 11/2022 | Pigazzi et al. |
| 11,510,836 | B2 | 11/2022 | Cole et al. |
| 11,607,358 | B2 | 3/2023 | Spahn et al. |
| 11,638,670 | B1 | 5/2023 | Volz et al. |
| 11,642,267 | B2 | 5/2023 | Kea et al. |
| 11,654,068 | B2 | 5/2023 | Giap |
| 11,661,129 | B2 | 5/2023 | Chambers et al. |
| 11,701,281 | B2 | 7/2023 | Meah |
| D997,364 | S | 8/2023 | Hahn et al. |
| 11,737,939 | B2 | 8/2023 | Davis et al. |
| D1,004,016 | S | 11/2023 | Howard |
| D1,005,738 | S | 11/2023 | Fan |
| 11,833,091 | B2 | 12/2023 | Vrzalik et al. |
| 11,890,240 | B2 | 2/2024 | Ponsi et al. |
| D1,033,986 | S | 7/2024 | Pinter |
| D1,035,318 | S | 7/2024 | De Grasse et al. |
| 12,208,044 | B2 | 1/2025 | Kurt et al. |
| 12,390,383 | B2 | 8/2025 | Fowler |
| D1,092,098 | S | 9/2025 | Mo |
| D1,103,649 | S | 12/2025 | Chen |
| 12,508,182 | B2 | 12/2025 | Wolters et al. |
| 12,533,276 | B2 | 1/2026 | Fox et al. |
| D1,122,450 | S | 4/2026 | Fowler |
| 2001/0013146 | A1 | 8/2001 | Wempe |
| 2001/0040402 | A1 | 11/2001 | Odderson |
| 2002/0029417 | A1 | 3/2002 | Walker |
| 2002/0108179 | A1 | 8/2002 | Kiser |
| 2002/0109381 | A1 | 8/2002 | Duncan |
| 2002/0112286 | A1 | 8/2002 | Upton et al. |
| 2002/0133877 | A1 | 9/2002 | Kuiper et al. |
| 2002/0148045 | A1 | 10/2002 | Giori et al. |
| 2002/0148474 | A1 | 10/2002 | Larson |
| 2003/0009952 | A1 | 1/2003 | Gallant et al. |
| 2003/0014821 | A1 | 1/2003 | Boyd |
| 2003/0030319 | A1 | 2/2003 | Clapper |
| 2003/0041379 | A1 | 3/2003 | Habboub et al. |
| 2003/0061663 | A1 | 4/2003 | Lampel |
| 2003/0066134 | A1 | 4/2003 | Chapman |
| 2003/0159212 | A1 | 8/2003 | Patrick et al. |
| 2003/0205920 | A1 | 11/2003 | Sprouse et al. |
| 2004/0083550 | A1 | 5/2004 | Graebe, Jr. |
| 2004/0123382 | A1 | 7/2004 | Berge |
| 2004/0237203 | A1 | 12/2004 | Romano et al. |
| 2005/0005358 | A1 | 1/2005 | Dudonis |
| 2005/0028273 | A1 | 2/2005 | Weedling et al. |
| 2005/0034242 | A1 | 2/2005 | Davis |
| 2005/0055768 | A1 | 3/2005 | Assink |
| 2005/0076437 | A1 | 4/2005 | Johnson |
| 2005/0091749 | A1 * | 5/2005 | Humbles ............ A61G 13/1235 5/646 |
| 2005/0102750 | A1 | 5/2005 | Berge |
| 2005/0151410 | A1 | 7/2005 | Sprouse, II |
| 2005/0210595 | A1 | 9/2005 | Di Stasio et al. |
| 2005/0229314 | A1 | 10/2005 | Chisari |
| 2005/0235423 | A1 | 10/2005 | Hetzel et al. |
| 2006/0000016 | A1 | 1/2006 | Weedling et al. |
| 2006/0037142 | A1 | 2/2006 | Binder |
| 2006/0072347 | A1 | 4/2006 | Ferraro |
| 2006/0075562 | A1 | 4/2006 | DiGirolamo |
| 2006/0162086 | A1 | 7/2006 | Davis |
| 2006/0213010 | A1 | 9/2006 | Davis |
| 2007/0006388 | A1 | 1/2007 | Townsend |
| 2007/0072690 | A1 | 3/2007 | Berenson et al. |
| 2007/0074760 | A1 | 4/2007 | Wu |
| 2007/0118993 | A1 | 5/2007 | Bates |
| 2007/0266494 | A1 | 11/2007 | DeLuca et al. |
| 2007/0283498 | A1 | 12/2007 | Shelby |
| 2008/0022461 | A1 | 1/2008 | Bartlett et al. |
| 2008/0028516 | A1 | 2/2008 | Morishima |
| 2008/0029940 | A1 | 2/2008 | Kammer et al. |
| 2008/0078033 | A1 | 4/2008 | Wyatt et al. |
| 2008/0209630 | A1 | 9/2008 | Kazala et al. |
| 2008/0216231 | A1 | 9/2008 | Lambarth et al. |
| 2008/0289102 | A1 | 11/2008 | Davis |
| 2009/0000037 | A1 | 1/2009 | Graebe, Jr. |
| 2009/0211168 | A1 | 8/2009 | Bogar |
| 2009/0265857 | A1 | 10/2009 | Habegger |
| 2009/0295203 | A1 | 12/2009 | Lewis et al. |
| 2010/0257703 | A1 | 10/2010 | Vass |
| 2010/0263127 | A1 | 10/2010 | Jamshidi |
| 2010/0290931 | A1 | 11/2010 | Sanders et al. |
| 2011/0035880 | A1 | 2/2011 | Cole et al. |
| 2011/0056017 | A1 | 3/2011 | Schreiber et al. |
| 2011/0068939 | A1 | 3/2011 | Lachenbruch |
| 2011/0072579 | A1 | 3/2011 | Receveur et al. |
| 2011/0219546 | A1 | 9/2011 | West |
| 2011/0247725 | A1 | 10/2011 | Frayne et al. |
| 2011/0271444 | A1 | 11/2011 | Davis |
| 2011/0277234 | A1 | 11/2011 | Jasani |
| 2011/0296609 | A1 * | 12/2011 | Giap .................... A61G 7/1063 5/88.1 |
| 2011/0304186 | A1 | 12/2011 | Andrews |
| 2012/0009844 | A1 | 1/2012 | Waters et al. |
| 2012/0073053 | A1 | 3/2012 | Turner et al. |
| 2012/0073056 | A1 | 3/2012 | Freund et al. |
| 2012/0085430 | A1 | 4/2012 | Johansson et al. |
| 2012/0124752 | A1 | 5/2012 | Patrick |
| 2012/0131746 | A1 | 5/2012 | Griffin et al. |
| 2012/0144594 | A1 | 6/2012 | Nash |
| 2012/0186012 | A1 | 7/2012 | Ponsi et al. |
| 2012/0186013 | A1 | 7/2012 | Ponsi |
| 2012/0186587 | A1 | 7/2012 | Steffens et al. |
| 2012/0210511 | A1 | 8/2012 | Davis |
| 2012/0245500 | A1 | 9/2012 | Polliack et al. |
| 2012/0255124 | A1 | 10/2012 | West |
| 2012/0292958 | A1 | 11/2012 | Sprouse, II |
| 2012/0304384 | A1 | 12/2012 | Scholz et al. |
| 2012/0311783 | A1 | 12/2012 | Chiang et al. |
| 2013/0019882 | A1 | 1/2013 | Durham et al. |
| 2013/0042409 | A1 | 2/2013 | Gomez et al. |
| 2013/0042414 | A1 | 2/2013 | Schreiber et al. |
| 2013/0104907 | A1 | 5/2013 | Giap |
| 2013/0145549 | A1 | 6/2013 | Piegdon et al. |
| 2013/0152304 | A1 | 6/2013 | Dovervik et al. |
| 2013/0152950 | A1 * | 6/2013 | Giap .................... A61G 7/1026 128/872 |
| 2013/0205495 | A1 | 8/2013 | Ponsi et al. |
| 2013/0232693 | A1 | 9/2013 | Myers |
| 2013/0263377 | A1 | 10/2013 | Wootten |

(56) References Cited

U.S. PATENT DOCUMENTS

| | | | |
|---|---|---|---|
| 2013/0269111 | A1 | 10/2013 | Berg |
| 2013/0270881 | A1 | 10/2013 | Fowler et al. |
| 2013/0318723 | A1 | 12/2013 | Li |
| 2013/0320746 | A1 | 12/2013 | Amirault et al. |
| 2013/0340772 | A1 | 12/2013 | Carlson et al. |
| 2014/0007351 | A1 | 1/2014 | Cohen |
| 2014/0082836 | A1 | 3/2014 | Patrick et al. |
| 2014/0250601 | A1 | 9/2014 | Gomez |
| 2014/0277307 | A1 | 9/2014 | Gammons et al. |
| 2014/0283305 | A1 | 9/2014 | Zysman |
| 2014/0304918 | A1 | 10/2014 | Steffens et al. |
| 2014/0338121 | A1 | 11/2014 | Giap |
| 2014/0352072 | A1 | 12/2014 | Holladay |
| 2014/0366271 | A1 | 12/2014 | Marshall et al. |
| 2015/0040326 | A1 | 2/2015 | Fairburn et al. |
| 2015/0101126 | A1 | 4/2015 | Reiners et al. |
| 2015/0113735 | A1 | 4/2015 | Anderson et al. |
| 2015/0122266 | A1 | 5/2015 | Saunders et al. |
| 2015/0143628 | A1 | 5/2015 | Fowler et al. |
| 2015/0189996 | A1 | 7/2015 | Scarlett et al. |
| 2015/0224217 | A1 | 8/2015 | Rogers |
| 2015/0225097 | A1 | 8/2015 | Anastasia |
| 2015/0238378 | A1 | 8/2015 | Bhat et al. |
| 2015/0289817 | A1 | 10/2015 | Augustine et al. |
| 2015/0290027 | A1 | 10/2015 | Augustine et al. |
| 2015/0290062 | A1 | 10/2015 | Augustine et al. |
| 2015/0335165 | A1 | 11/2015 | Creekmuir et al. |
| 2015/0369384 | A1 | 12/2015 | Frayne |
| 2016/0095777 | A1 | 4/2016 | Berman |
| 2016/0213179 | A1 | 7/2016 | Beckman |
| 2016/0228281 | A1 | 8/2016 | Marshall et al. |
| 2016/0245439 | A1 | 8/2016 | Fry |
| 2016/0279007 | A1* | 9/2016 | Flatt ..................... A61G 13/126 |
| 2017/0049646 | A1 | 2/2017 | Rigoni et al. |
| 2017/0049647 | A1 | 2/2017 | Rigoni et al. |
| 2017/0065473 | A1 | 3/2017 | Scott |
| 2017/0112655 | A1* | 4/2017 | Giap .................... A61G 7/1023 |
| 2017/0119608 | A1 | 5/2017 | Rigoni et al. |
| 2017/0216117 | A1 | 8/2017 | Rigoni et al. |
| 2017/0231410 | A1 | 8/2017 | Chon et al. |
| 2017/0239118 | A1 | 8/2017 | Cole et al. |
| 2017/0326011 | A1 | 11/2017 | Alvarez et al. |
| 2018/0017177 | A1 | 1/2018 | Marson et al. |
| 2018/0104125 | A1 | 4/2018 | Vahala et al. |
| 2018/0140457 | A1 | 5/2018 | Sarma |
| 2018/0192960 | A1 | 7/2018 | Augustine et al. |
| 2018/0200130 | A1 | 7/2018 | Liu |
| 2018/0221229 | A1 | 8/2018 | Kaiser et al. |
| 2018/0221242 | A1 | 8/2018 | Lee et al. |
| 2018/0289174 | A1 | 10/2018 | Ye et al. |
| 2018/0303690 | A1 | 10/2018 | Hahn et al. |
| 2018/0311097 | A1 | 11/2018 | Rodzewicz et al. |
| 2018/0353360 | A1* | 12/2018 | Kea ........................ A61G 7/065 |
| 2018/0369050 | A1 | 12/2018 | Davis et al. |
| 2019/0046382 | A1* | 2/2019 | Pigazzi .................... A61G 7/10 |
| 2019/0049027 | A1 | 2/2019 | Bais |
| 2019/0059603 | A1 | 2/2019 | Griffith et al. |
| 2019/0083341 | A1 | 3/2019 | Ulreich et al. |
| 2019/0091084 | A1 | 3/2019 | Messerschmidt |
| 2019/0104996 | A1 | 4/2019 | Augustine et al. |
| 2019/0151177 | A1 | 5/2019 | Giap |
| 2019/0159843 | A1* | 5/2019 | Demri .................. A61G 13/129 |
| 2019/0358102 | A1 | 11/2019 | Ueda |
| 2019/0365586 | A1 | 12/2019 | Latiff et al. |
| 2020/0008976 | A1 | 1/2020 | Molloy et al. |
| 2020/0060912 | A1* | 2/2020 | Hollabaugh ....... A61G 7/05769 |
| 2020/0100606 | A1 | 4/2020 | Ganji |
| 2020/0360216 | A1 | 11/2020 | Larkin et al. |
| 2021/0077327 | A1 | 3/2021 | Kurt et al. |
| 2021/0093498 | A1 | 4/2021 | Lafleche et al. |
| 2021/0275371 | A1 | 9/2021 | Fowler et al. |
| 2021/0401076 | A1 | 12/2021 | Jenkins et al. |
| 2022/0000692 | A1 | 1/2022 | Gomez |
| 2022/0023121 | A1 | 1/2022 | Davis |
| 2022/0096304 | A1 | 3/2022 | Kaiser et al. |
| 2022/0323283 | A1 | 10/2022 | Boulos et al. |
| 2022/0339045 | A1 | 10/2022 | Cook et al. |
| 2023/0011458 | A1 | 1/2023 | Parikh et al. |
| 2023/0064553 | A1 | 3/2023 | Fogel et al. |
| 2024/0156661 | A1 | 5/2024 | Kaforey |
| 2024/0156662 | A1 | 5/2024 | Kaforey et al. |
| 2024/0216201 | A1 | 7/2024 | Fox et al. |

FOREIGN PATENT DOCUMENTS

| | | | |
|---|---|---|---|
| CN | 108741913 | A | 11/2018 |
| CN | 208259823 | U | 12/2018 |
| CN | 211326149 | U | 8/2020 |
| CN | 306633192 | | 6/2021 |
| DE | 10 2010 007 457 | | 8/2011 |
| EP | 3 162 347 | A1 | 5/2017 |
| EP | 3 705 100 | A1 | 9/2020 |
| EP | 3 861 972 | A1 | 8/2021 |
| EP | 3 890 560 | A1 | 10/2021 |
| EP | 3 705 100 | B1 | 1/2022 |
| FR | 2923367 | A1 | 5/2009 |
| GB | 2 300 845 | A | 11/1996 |
| GB | 2 402 075 | A | 12/2004 |
| GB | 2 415 912 | | 1/2006 |
| GB | 6 302 170 | | 8/2023 |
| JP | H10-117907 | A | 5/1998 |
| SE | 527345 | C2 | 2/2006 |
| WO | WO-88/10082 | A1 | 12/1988 |
| WO | WO-96/27357 | A1 | 9/1996 |
| WO | WO-02/065877 | A1 | 8/2002 |
| WO | WO-2004/050002 | A1 | 6/2004 |
| WO | WO-2005/007673 | | 1/2005 |
| WO | WO-2005/086664 | A2 | 9/2005 |
| WO | WO-2005/107673 | A1 | 11/2005 |
| WO | WO-2012/001423 | | 1/2012 |
| WO | WO-2012/170934 | A2 | 12/2012 |
| WO | WO-2015/081233 | A1 | 6/2015 |
| WO | WO-2015/081271 | A2 | 6/2015 |
| WO | WO-2017/185039 | A2 | 10/2017 |
| WO | WO-2017/197326 | A1 | 11/2017 |
| WO | WO-2019/060424 | A1 | 3/2019 |
| WO | WO-2019/152624 | A1 | 8/2019 |
| WO | WO-2020/041493 | A1 | 2/2020 |
| WO | WO-2020/136796 | A1 | 7/2020 |
| WO | WO-2022/226309 | A1 | 10/2022 |

OTHER PUBLICATIONS

International Search Report and Written Opinion for International Application No. PCT/US2022/018215, mailed Aug. 9, 2022, 18 pages.

Blaine Miller, Provisional Draft Declaration, U.S. Pat. No. 8,511,314, Reexamination Control No. 90/013,087, published Dec. 18, 2018, 11 pages.

Craig Kaforey, Declaration, U.S. Pat. No. 8,511,314, Reexamination Control No. 90/013,087, published Sep. 10, 2014, 13 pages.

Craig Kaforey, Declaration, U.S. Pat. Nos. 8,511,314 and 8,464,720, Reexamination Control Nos. 90/013,088 and 90/013,088, published Apr. 18, 2014, 3 pages.

Craig Kaforey, Declaration, U.S. Pat. Nos. 8,511,314 and 8,464,720, Reexamination Control Nos. 90/013,088 and 90/013,088, published Sep. 10, 2014, 6 pages.

Dr. Alessio Pigazzi, Declaration, U.S. Pat. Nos. 8,511,314 and 8,464,720, Reexamination Control Nos. 90/013,088 and 90/013,088, published Sep. 10, 2014, 30 pages.

Dr. Gustavo Plasencia, Declaration, U.S. Pat. Nos. 8,511,314 and 8,464,720, Reexamination Control Nos. 90/013,088 and 90/013,088, published Sep. 10, 2014, 28 pages.

Dr. Maheswari Senthil, Declaration, U.S. Pat. No. 8,511,314, Reexamination Control No. 90/013,087, published Apr. 18, 2014, 18 pages.

Dr. Thomas Ljungman, Declaration, U.S. Pat. Nos. 8,511,314 and 8,464,720, Reexamination Control Nos. 90/013,088 and 90/013,088, published Sep. 10, 2014, 9 pages.

Glenn E. Beltz, Affidavit, U.S. Pat. Nos. 8,511,314 and 8,464,720, Reexamination Control Nos. 90/013,088 and 90/013,088, published Sep. 10, 2014, 19 pages.

(56) References Cited

OTHER PUBLICATIONS

Gustavo Plasencia, Declaration, U.S. Pat. No. 8,511,314, Reexamination Control No. 90/013,087, published Apr. 18, 2014, 29 pages.
Jennifer Klauschie et al., "Use of Anti-Skid Material and Patient-Positioning to Prevent Patient Shifting during Robotic-Assisted Gynecologic Procedures," J. Minim Invasive Gynecol., 2010; 17(4):504-507.
Michael Madigan, Affidavit, U.S. Pat. Nos. 8,511,314 and 8,464,720, Reexamination Control Nos. 90/013,088 and 90/013,088, published Sep. 10, 2014, 32 pages.
Paul Lloyd, Declaration, U.S. Pat. Nos. 8,511,314 and 8,464,720, Reexamination Control Nos. 90/013,088 and 90/013,088, published Sep. 10, 2014, 4 pages.
Record of Oral Hearing held Dec. 14, 2015, Appeal No. 2015-007832, Reexamination Control No. 90/013,088, mailed Jan. 4, 2016.
Soule Medical, Patient Positioning Systems Product Catalog, published Jan. 1, 2015, 63 pages.
Fanwer Positioner, Online, Published date Aug. 3, 2024, Retrieved on Aug. 14, 2025 from URL: https://www.amazon.com/Positioning-Wedge-Pillow-Connection-Positioners/dp/BODFXRKLCN (Year: 2024).
HoverMatt Positioner, Online, Published date Nov. 9, 2023, Retrieved on Aug. 14, 2025 from URL: https://WWW.youtube.com/watch?v=M LWnNkOowtA (Year: 2023).
Author Unknown, "Clinical Health Services, Inc. Therapist's Choice Triangle Massage Bolster Extra Large, 19" x 12" x 20" x 15.5", (Burgundy)," Clinical Health Services, Published Apr. 20, 2011, Accessed on May 29, 2025 from URL: https://www.amazon.com/Therapists-Choice%C2%AE-Triangle-Massage-Burgundy/dp/B004XJ5112?th= 1v, 4 pages.
Author Unknown, "Positioning Wedge Pillow Side Sleeping Belt Connection, Limit Width Adjustable Bed Wedges Body Positioners for Back Pain Relief, Back Positioning Wedge for After Surgery, Anti Snoring, Back Support," Connection Positioner, Published Nov. 25, 2024, Accessed on May 29, 2026 from URL https://www.amazon.com/Positioning-Wedge-Pillow-Connection-Positioners/dp/B0DFXRKLCN (9 pages).
"Boost" Definition in the Cambridge English Dictionary, in Non-Final Office Action mailed on May 11, 2021, for U.S. Appl. No. 16/547,343.
"How to Set Up Kool Kat", Aug. 11, 2013, SKY High Amusements, Minutes 1:55-2:30, http://www.youtube.com/watch?v=a966cR6v6sc (Year: 2013).
Dec. 4, 2012—(WO) International Search Report and Written Opinion—App PCT/US2012/041729, 15 pages.
Dec. 10, 2013—International Preliminary Report on Patentability—App PCT/US2012/041729, 8 pages.
Dec. 31, 2013—(US) Final Office Action—U.S. Appl. No. 13/014,497.
Jul. 12, 2013—(WO) International Search Report and Written Opinion—App PCT/US2013/036448, 9 pages.
Jul. 2, 2013—(US) Non-Final Office Action—U.S. Appl. No. 13/014,497.
Mar. 20, 2013—(US) Non-Final Office Action—U.S. Appl. No. 13/014,500.
Mar. 28, 2014—(US) Non-Final Office Action—U.S. Appl. No. 13/156,103.
May 15, 2014—(WO) International Search Report and Written Opinion—App PCT/US12/22572, 25 pages.
Nov. 28, 2014—(EP) Search Report—App 14159820.1.
Jun. 25, 2015—(EP) Extended Search Report—App 12739957.4.
May 15, 2015—(WO) International Search Report and Written Opinion—App PCT/US2014/067672.
Sep. 14, 2015—(US) Non-Final Office Action—U.S. Appl. No. 13/838,952.
Mar. 14, 2016—(EP) Office Action—App 12739957.4.
Church et al., "Burn Wound Infections", Clinical Microbiology Reviews, 2006, vol. 19, No. 2, pp. 403-343.
Coleman Quick Pump Fitting Replacement Nozzle Main Adapter and Pinch Valve Tip, Sep. 6, 2014, Amazon.com, https://www.amazon.com/Coleman-Fitting-Replacement-Nozzle-Adapter/dp/B00JHRJ03A/ref=cm_cr_arp_d_product_top?ie=UTF8.
Communication pursuant to Article 94(3) EPC for EP Application No. 12728152.5 date Apr. 22, 2015, 5 pages.
Immedia OneWayGlide Rehab Assist, Jun. 15, 2004 http://www.rehabassist.com.au/immedia.htm.
International Preliminary Report on Patentability for International Application No. PCT/US2022/018215, mailed Oct. 19, 2023, 10 pages.
International Search Report and Written Opinion for International Application No. PCT/US2017/028954, mailed Nov. 24, 2017, 16 pages.
International Search Report and Written Opinion for International Application No. PCT/US2018/037372, mailed Sep. 13, 2018, 13 pages.
International Search Report and Written Opinion for International Application No. PCT/US2019/047540, mailed Nov. 14, 2019, 13 pages.
OneWayGlide Instruction for Use, Immedia, Version 6, 2016, p. 7.
Photos of Stryker Glide holding strap, date unknown, two pages.
Prism Medical Company, 5300 Ergoglide Instructions, 2009, 2 pp. Maryland Heights, MO.
Romedic OneWaySlide, Handicare, Dec. 6, 2010.
Stryker Operations/Maintenance Manual for Stryker Glide Lateral Air Transfer System, Model 3062, date unknown, 33 pages.
Textbook of Palliative Nursing, Nov. 10, 2005, Oxford University Press, XP002740850, 1 page.
Waverley Glen, One-Way Glide—The Grimstead Range of Transfer and Repositioning Aids, Ontario Canada, downloaded Jun. 11, 2012, 3 pages.

* cited by examiner

PATIENT POSITIONING SYSTEMS AND METHODS

CROSS-REFERENCE TO RELATED APPLICATIONS

This application claims the benefit of and priority to U.S. Provisional Patent Application No. 63/173,171, filed on Apr. 9, 2021, entitled "Patient Positioning Device and Method of Use Thereof," U.S. Provisional Patent Application No. 63/240,539, filed on Sep. 3, 2021, entitled "Patient Positioning Systems and Methods," and U.S. Provisional Patent Application No. 63/277,383, filed on Nov. 9, 2021, entitled "Patient Positioning Systems and Methods," all of which are hereby incorporated by reference herein.

BACKGROUND

The present disclosure generally relates to an apparatus, system, and method for supporting a patient for a medical procedure, and in particular for supporting a patient when positioned in a non-parallel or tilted position, such as in the Trendelenburg position.

When a patient is unconscious, disabled, or otherwise unable to move on their own, it is often difficult to retain the patient in a consistent position so as to keep the patient safe and out of the way of operating room staff. For example, when patients undergo surgery, it is often necessary to tilt the operating table on which the patient rests in order to gain access to the surgical area. Tilting the operating table results in the patient laying supine at an angle, wherein the patient's feet may be above the patient's head or the patient's head may be above the patient's feet. One such common positioning in surgery is the Trendelenburg position, where the patient is tilted at 15° to 45° and the patient's feet are elevated above the patient's head. When the patient is in the Trendelenburg position (or the reverse Trendelenburg position (i.e., the patient's feet are down and their head is elevated), the lithotomy position (i.e., the patient is on their back with their legs flexed), the High Fowler's position (i.e., the patient is sitting with the upper half of their body upward), or laterally tilted, etc.), it is difficult to maintain the patient's position upon the operating table.

Furthermore, a patient's arms often need to be adducted during surgeries in order to keep the patient's arms safe from cuts, burns, and generally out of the way. However, in keeping the patient's arms safe and secure, doctors often lean against the patient's arms while operating, which may subject the patient to related-pressure injuries or potential nerve damage.

The present disclosure seeks to overcome certain of these limitations and other drawbacks of existing devices, systems, and methods, and to provide new features not heretofore available.

SUMMARY

At least one embodiment relates to a method for reprocessing a patient positing system, the system comprising inflatable device and a high-friction pad configured to attach to the inflatable device. The method includes removing the high-friction pad from the inflatable device, at least one of cleaning or sterilizing the inflatable device, and providing a replacement for at least one component of the patient positioning system.

Another embodiment relates to a method of preparing a patient positioning system for reuse. The method includes obtaining a used inflatable device, the inflatable device comprising at least one connection mechanism for coupling to a high-friction pad, and providing a replacement high-friction pad to replace an original high-friction pad that was used with the inflatable device.

Another embodiment relates to a patient support system. The patient support system comprises a high-friction pad having a top surface and a bottom surface, where the top surface is configured to support a patient and the bottom surface is configured to face a support structure. The high-friction pad also includes at least one arm wrap including a foam section, where the at least one arm wrap is configured to secure an arm of the patient, and at least one strap, where the at least one strap is configured to couple the high-friction pad to the support structure.

Another embodiment relates to a method, the method including providing a patient positioning system. The patient positioning system includes a high-friction pad having a top surface and a bottom surface, the top surface configured to support a patient and the bottom surface configured to face a support structure. The high-friction pad also includes at least one arm wrap including a foam section, the at least one arm wrap configured to secure an arm of the patient, and at least one strap, the at least one strap configured to couple the high-friction pad to the support structure. The method further includes placing the high-friction pad on the support structure, such that the bottom surface faces the support structure, and attaching the high-friction pad to the support structure using the at least one strap.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE DRAWINGS

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
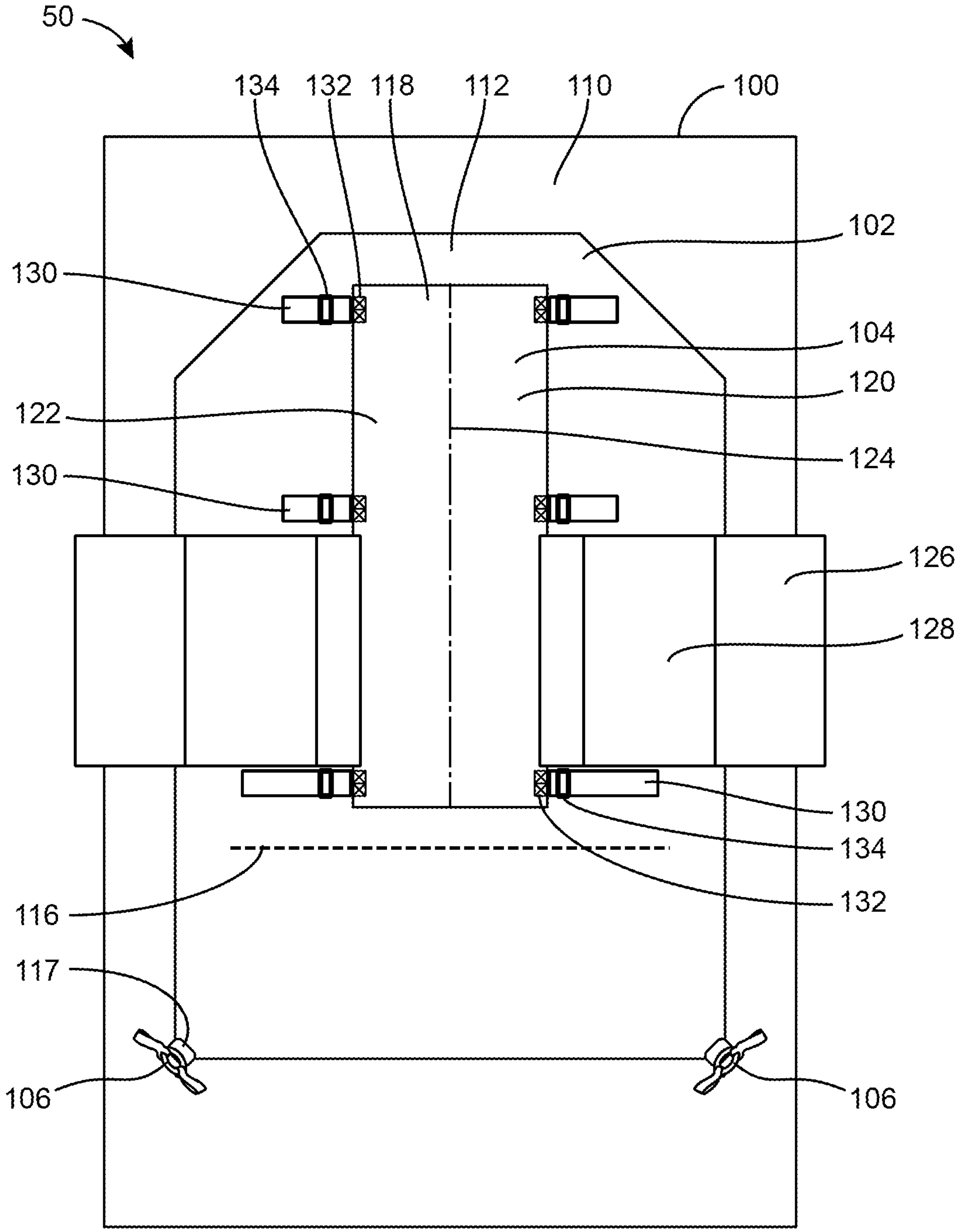
FIG. 1 is a top view of a patient positioning system, according to an exemplary embodiment.

Referring to FIG. 1, a patient positioning system 50 is shown, according to an exemplary embodiment. As shown in FIG. 1, the patient positioning system 50 includes an inflatable patient support device 102 (hereinafter, "inflatable device" 102) and a high-friction pad 104. The high-friction pad 104 is shown lying on the inflatable device 102, with the inflatable device 102 lying on a support structure 100. Exemplary embodiments of the patient positioning system 50 are described below, though the patient positioning system 50 may include other components and/or incorporate other techniques for positioning a patient as described in U.S. patent application Ser. No. 16/007,712, titled "Patient Positioning and Support System," filed Jun. 13, 2018, and U.S. patent application Ser. No. 17/488,213, titled "Systems and Methods for Supporting and Stabilizing a Patient During Hip Distraction," filed Sep. 28, 2021, the entire disclosures of which are both incorporated by reference herein.

Figure 2:
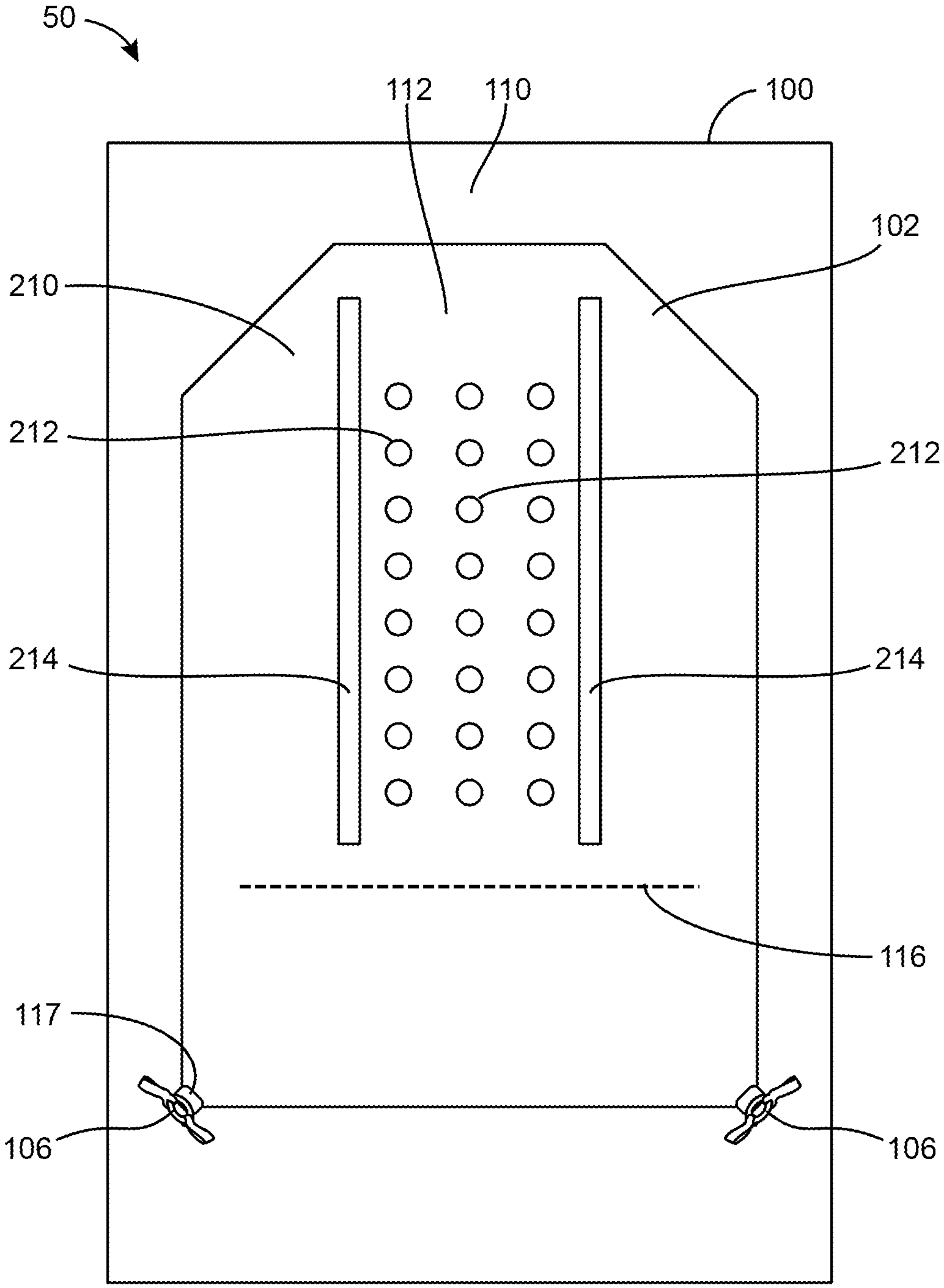
FIG. 2 is a top view of an inflatable device of the patient positioning system of FIG. 1, according to an exemplary embodiment.

As shown in FIGS. 1-2, the support structure 100 includes a support surface 110. The support surface 110 (or support structure 100) may be a bed, gurney, stretcher, cot, operating table, or other support suitable for medical and/or patient care use (e.g., for supporting a patient in a supine or other position). The support structure 100, and corresponding support surface 110, are not shown in detail, but may generally include other known features of medical support for patient care use (e.g., a frame, the support structure 100 supported by the frame, the support structure 100 including a head, a foot, opposed sides or edges, etc.). Similarly, the support structure 100 may also include other medical components known in the art (e.g., bed sheets, pillows, blankets, additional sheets, etc.). In some embodiments, the support structure 100 is adjustable, such that the support structure 100 (and the support surface 110) may be raised, lowered, positioned in an incline, positioned in a decline, etc. In an exemplary embodiment, the support structure 100 (and the support surface 110) is/are a monolithic structure; however, in other embodiments the support structure 100 (and the support surface 110) comprise a plurality of sections that are coupled (e.g., hingedly, slidably, rotatably, etc.) along an interface (e.g., a break line, etc.). For example, the support structure 100 (and the support surface 110) may include a first section for supporting a portion of the patient (e.g., upper body, mid-section, etc.), and a second section coupled to the first section, which is configured to move (hingedly lower, slidably lower, hingedly raise, pivot, etc.) relative to the first section and/or position another portion of the patient (e.g., lower body, hips, legs, feet, etc.). It should be understood that the patient positioning system 50, and the components thereof, may be used with different support structures 100, inflatable devices 102, high-friction pads 104, etc., and may be used to transfer a patient from one support structure 100 to another, or from one support structure 100 to a different support structure 100.

As shown in FIGS. 1-2, the inflatable device 102 includes a top surface 112, a bottom surface 114 (not shown), an alignment indicia shown as alignment line 116, and inflation ports 117. In an exemplary embodiment, the inflatable device 102 is positioned on the support structure 100. More specifically, the inflatable device 102 may be positioned on the support surface 110, such that the bottom surface 114 of the inflatable device 102 is supported by the support surface 110. Although the inflatable device 102 may be in contact with the support surface 110, the inflatable device 102 may include one or more structures located between the bottom surface 114 and the support surface 110. Further, in some embodiments the inflatable device 102 includes inflation ports 117 (e.g., configured to couple to inflation socks 106) for inflating the inflatable device 102. In an exemplary embodiment, the inflatable device 102 is flexible and foldable when in the non-inflated state, and is generally rectangular in shape, with a chamfered edge and peripheral edges. In other embodiments, the inflatable device 102 is another suitable shape, including different shapes with varying degrees of symmetry (e.g., rectangular with no chamfered edges, rectangular with rounded edges, rounded, etc.). In an exemplary embodiment, the inflatable device 102 is approximately 50 inches in length; however, in other embodiments the inflatable device 102 is longer or shorter.

As shown in FIGS. 1-2, the alignment line 116 is provided near a bottom portion of the top surface 112 of the inflatable device 102, and is configured to aid in aligning components of the patient positioning system 50. For example, the alignment line 116 may aid a user in aligning the inflatable device 102 relative to the support structure 100 (e.g., aligning the alignment line 116 at the break line of the support structure 100, where a second section of the support structure 100 pivots relative to a first section, etc.). In some embodiments, the alignment line 116 is configured to aid a user in aligning the high-friction pad 104 relative to components of the inflatable device 102 (e.g., a connection area, a connection strip, etc.). In other embodiments, the alignment line 116 is configured to aid a user in aligning other components of the patient positioning system 50 (e.g., a body pad, etc.) relative to the support structure 100, the inflatable device 102, and/or the high-friction pad 104. It should be understood that while the alignment indicia is shown as the alignment line 116, the indicia may be another suitable indicator (e.g., a bar, hatch, cross, color, dot, etc.), and/or positioned at any suitable location on the inflatable device 102 (e.g., head, side, middle, medial, lateral, etc. portion), such that the indicia may aid in positioning components of the patient positioning system 50.

As shown in FIG. 1, the high-friction pad 104 includes a top pad surface 118, a bottom pad surface 119 (not shown), a first pad section 120, a second pad section 122, a perforated separator 124, arm wraps 126 (including foam section(s) 128), and straps 130. In an exemplary embodiment, the high-friction pad 104 is positioned on the inflatable device 102, and supports to a patient while the inflatable device 102 is used for a number of different medical and/or patient care uses, as discussed below.

As shown in FIG. 1, the high-friction pad 104 is smaller than the inflatable device 102 (e.g., less than 50 inches in length), and is positioned on the inflatable device 102 above the alignment line 116 (i.e., not covering the alignment line 116) so as to provide support to a portion of the patient's body (e.g., upper body, mid-section, etc.). In other embodiments, the high-friction pad 104 is a similar size as the inflatable device 102 (e.g., around 50 inches in length), and/or is positioned at another position relative to the alignment line 116 (e.g., on top of, at, below, etc.). In an exemplary embodiment, the high-friction pad 104 has a thickness of approximately 1.0 inch +/−0.125 inch; however, in other embodiments the high-friction pad 104 is as thick as 2.0 inches or as thin as 0.125 inch. The high-friction pad 104 may be made of foam (e.g., open cell foam, gel imprinted polyether foam, etc.), cushion, and/or any other suitable material configured to cushion, secure, and/or support the patient. For example, the high-friction pad 104 may be made of a material with a high coefficient of friction so as to increase the friction between the patient and the inflatable device 102. In some embodiments, the top pad surface 118 and/or the bottom pad surface 119 include only portion(s) of the surfaces 118 and/or 119 with high coefficients of friction. In other embodiments, the top pad surface 118 and the bottom pad surface 119 have the same or different coefficients of friction. The high-friction pad 104 may be made of material with specific properties suitable for certain medical and/or patient care uses (e.g., fluid absorbent, low-lint properties, disposable, barrier to fluid passage on one side, breathable on another side, the same or different coefficients of friction on either side, etc.). The high-friction pad 104 may be configured differently in different embodiments.

As shown in FIG. 1, the high-friction pad 104 includes the first pad section 120 and the second pad section 122, separated by the perforated separator 124. The perforated separator 124 may be positioned along the central portion of the high-friction pad 104 (e.g., between the first pad section 120 and the second pad section 122). In an exemplary embodiment, the high-friction pad 104 may be ripped, cut, or otherwise torn along the perforated separator 124 to help move or reposition a patient (e.g., to remove the first pad section 120, the second pad section 122, and/or both), as discussed below.

Referring still to FIG. 1, the high-friction pad 104 also includes arm wraps 126, each having at least one foam section 128. In an exemplary embodiment, the arm wraps 126 are fully integrated with the high-friction pad 104, and are coupled (e.g., fastened, sewn, etc.) to the high-friction pad 104 by stitching, hook/loop fasteners, and/or another suitable fastening mechanism, as discussed below. According to an exemplary embodiment, the arm wraps 126 are formed of a material having a fastening feature (e.g., a loop material, hook material, etc.) at a portion of the arm wraps 126 (e.g., at a first surface, a second surface, a portion of a first surface, etc.). In some embodiments, the arm wraps 126 are also formed of a suitable flexible material (e.g., nylon, etc.). According to an exemplary embodiment, the arm wraps 126 are configured to secure a patient's arms in place when the high-friction pad 104 is in use with the patient. For example, the patient's arms may be adducted using the arm wraps 126 during a surgical procedure in order to prevent burns, cuts, pressure injuries, pinching, and/or keep the patient's arms out of the way of operating room staff. Further, the patient's arms (or other anatomy) may be secured, using the arm wraps 126, when the patient is Trendelenburg position, the reverse Trendelenburg position, the Lithotomy position, the Lateral Tilt position, and/or any other specific position needed for a surgical procedure and/or patient care use. In some embodiments, the arm wraps 126 are positioned at a portion of the high-friction pad 104 that support a patient's torso, such that the patient's arms lie near (or within) the arm wraps 126.

According to an exemplary embodiment, the arm wraps 126 also include at least one foam section 128 configured to cushion, secure, protect, and/or support the patient. In an exemplary embodiment, the foam section 128 is integrated with the arm wraps 126 via a suitable manufacturing technique (e.g., lamination, etc.). The foam section 128 may be formed of the same or similar material as the high-friction pad 104 (e.g., open cell foam, gel imprinted polyether foam, etc., cushion, and/or any other material). According to an exemplary embodiment, the foam section 128 is approximately 25 inches in length (e.g., a length extending in a direction substantially parallel to the perforated separator 124, etc.), and/or approximately 10 inches in width (e.g., a width extending in a direction substantially perpendicular to the perforated separator 124), and is configured to cover the patient's arm, hand, and/or fingers when the patient's arm is within the arm wrap 126. In this regard, the foam section 128 may keep the patient's arms comfortable, safe, and secure during surgical procedures. For example, the foam section 128 may reduce the potential pressure applied to the patient's arms during surgical procedures (e.g., if a surgeon leans on the patient's arms), and may prevent potential pressure-related injuries, pinching, and/or nerve damage. It should be understood that while the foam section 128 is described as having certain lengths and/or widths, the foam section 128 may be another suitable length (e.g., 20, 22.5, 27.5, 30, etc. inches) and/or width (e.g., 7.5, 8, 8.5, 9, 9.5, 10.5, 11, 11.5, 12, etc. inches), such that the foam section 128 is configured to cover (partially, completely, etc.) the patient's arm, hand, and/or fingers when the patient's arm is within the arm wrap 126.

As shown in FIG. 1, the high-friction pad 104 also includes straps 130. The straps 130 may be coupled with the high-friction pad 104 (and/or any of its component parts), and may be configured to secure the high-friction pad 104, for example, to the support structure 100, the inflatable device 102, etc. The straps 130 may be formed of any suitable material (e.g., fastening material, flexible material, etc.), and may be configured to fasten to components of the high-friction pad 104 (e.g., the strap 130 itself, other straps 130, the arm wraps 126, the foam section 128, etc.). For example, the straps 130 may be formed of a combination hook/loop material at least at a portion of the straps 130 (e.g., a combination hook/loop material on a first side, or a hook material on a first side and a loop material on a second side, etc.), and may be configured to loop around the support structure 100 and fasten to itself (e.g., strap 130 via the hook/look material, etc.), as discussed below. As shown in FIG. 1, the high-friction pad 104 includes three straps 130 on each lateral side of the high-friction pad 104. In an exemplary embodiment, the straps 130 on a first lateral side are aligned with straps 130 on the opposing lateral side, thereby forming pairs of aligned straps 130. In other embodiments, the high-friction pad 104 includes any suitable number straps 130 (e.g., one, two, four, five, six, seven, eight, nine, ten, etc.), and/or the straps 130 are positioned in any suitable arrangement along the high-friction pad 104 (e.g., along the head, foot, arm wraps 126, etc.).

As shown in FIG. 1, the straps 130 are coupled to the high-friction pad 104 by stitching 132. According to an exemplary embodiment, the stitching 132 integrates (e.g., sews, fastens, couples, fixes, etc.) the straps 130 to the high-friction pad 104. In an exemplary embodiment, the stitching 132 is a double-boxed stitch; however, in other embodiments, the stitching 132 is another suitable type of stitching (e.g., zigzag, straight stretch, stretch knit, closed overlock, honeycomb, etc.). In yet other embodiments, the stitching 132 is another suitable type of coupling (e.g., hook/loop fasteners, adhesives, etc.) configured to couple the straps 130 to the high-friction pad 104.

Also shown in FIG. 1, the high-friction pad 104 includes buckles 134. According to an exemplary embodiment, the buckles 134 are positioned along a lateral side (e.g., an edge) of the high-friction pad 104 (e.g., at the straps 130, the stitching 132, etc.), and are configured to receive (e.g., loop, hook, etc.) the straps 130 through the opening in the buckle 134. In some embodiments, the buckles 134 are coupled to other components of the high-friction pad 104 (e.g., the straps 130, the stitching 132, etc.), and/or are positioned at other suitable positions at the high-friction pad 104 (e.g., along the head, foot, etc.). As discussed briefly above, in an exemplary embodiment the straps 130 are configured to loop around anchors (e.g., under an anchor on the support structure 100, an external rail, etc.), pass through the buckles 134 (e.g., loop through, hook around, etc.), and couple the strap 130 to itself (e.g., via a hook/loop connection, etc.). In other embodiments, the straps 130 and/or the buckles 134 comprise other fastening components (e.g., snaps, hooks, hook and loop fasteners, etc.), and/or are configured to couple to other components of the high-friction pad 104 (e.g., the straps 130, the buckles 134, etc.).

Referring now to FIG. 2, a top view of the inflatable device 102 of the patient positioning system 50 is shown, according to an exemplary embodiment. As mentioned with regard to FIG. 1, the inflatable device 102 includes the top surface 112, the bottom surface 114 (not shown), the indicia shown as alignment line 116, and the inflation ports 117 (e.g., configured to couple to the inflation socks 106). Further, the inflatable device 102 also includes an inflatable body 210, a plurality of connection areas 212, and a plurality of connection strips 214.

In an exemplary embodiment, the inflatable body 210 defines an internal cavity and is configured to be inflated with air or another gaseous substance (e.g., via the inflation ports 117 using the inflation socks 106). The inflatable body 210 may be defined by the top surface 112 (e.g., a top sheet) and the bottom surface 114 (e.g., a bottom sheet), such that the surfaces 112 and 114 define the internal cavity to be inflated. In some embodiments, the surfaces 112 and 114 are made of materials that have properties that are desirable for a particular application (e.g., properties favorable for breathability, durability, imaging compatibility, flammability, biocompatibility, pressure distribution profile, heat transmission, electrical conductivity, cleaning properties, etc.). In other embodiments, the top surface 112 includes at least a portion of the surface formed from a high-friction or gripping material (e.g., knitted material, polyester, polyurethane coating, etc.), and the bottom surface 114 includes at least a portion of the surface formed from a low-friction material (e.g., sheet material). In yet other embodiments, both surfaces 112 and 114 are made from a low-friction material. The inflatable device 102 may be configured as described in U.S. Patent Application Publication Number US2018/0353360, entitled "Patient Positioning and Support System" filed on Jun. 13, 2018, which is hereby incorporated by reference in its entirety.

As shown in FIG. 2, the inflatable body 210 also includes one or more inflation-limiting structures (e.g., the plurality of connection areas 212), which are configured to create a specific inflated shape for the inflatable device 102. In general, the inflation-limiting structures are positioned between the surfaces 112 and 114 in order to limit the amount the surfaces 112 and 114 can move apart during inflation (e.g., while the inflatable device 102 is inflating). For example, the plurality of connection areas 212 may be positioned between the top surface 112 and the bottom surface 114, and form an inflation-limiting structure. Further, the plurality of connection areas 212 may be connected to the surfaces 112 and 114 in a variety of configurations (e.g., one or more concentric circles, three concentric circles, squares, rectangles, and/or any combination, etc.) and/or connection methods (e.g. stitching, adhesive, sealing, and/or any combination, etc.). In an exemplary embodiment, the inflatable device 102 fully inflated has a shape that is defined by the configuration of the inflatable device 102, as well as, the configuration of the plurality of connection areas 212.

Referring still to FIG. 2, the inflatable body 210 also includes a plurality of connection strips 214. In an exemplary embodiment, the connection strips 214 are made of hook and/or loop fasteners, and are configured to attach the bottom pad surface 119 (of the high-friction pad 104) to the top surface 112 (of the inflatable device 102), as discussed below. In some embodiments, the connection strips 214 are formed of different fastening mechanisms (e.g., strings, snaps, hooks, loops, etc.), and/or are configured to attach the top surface 112 (of the inflatable device 102) to other components of the patient positioning system 50 (e.g., a bottom surface of a body pad, etc.). In an exemplary embodiment, the connection strips 214 extend substantially the length of the inflatable body 210 (e.g., from the chamfer edge near the head of the inflatable body 210, along an edge, and to the foot). In other embodiments, the connection strips 214 do not extend the full length of the inflatable body 210, and/or have other configurations (e.g., extend along the head, foot, side edges, and/or any combination thereof). In yet other embodiments, the inflatable body 210 (and/or the inflatable device 102) also includes additional anchoring mechanisms (e.g., additional anchors, hooks, loops, straps, etc.), which allow the inflatable device 102 to further attach to the high-friction pad 104 (e.g., via the straps 130), and/or other components (e.g., the support structure 100, external rails, etc.).

Figure 3:
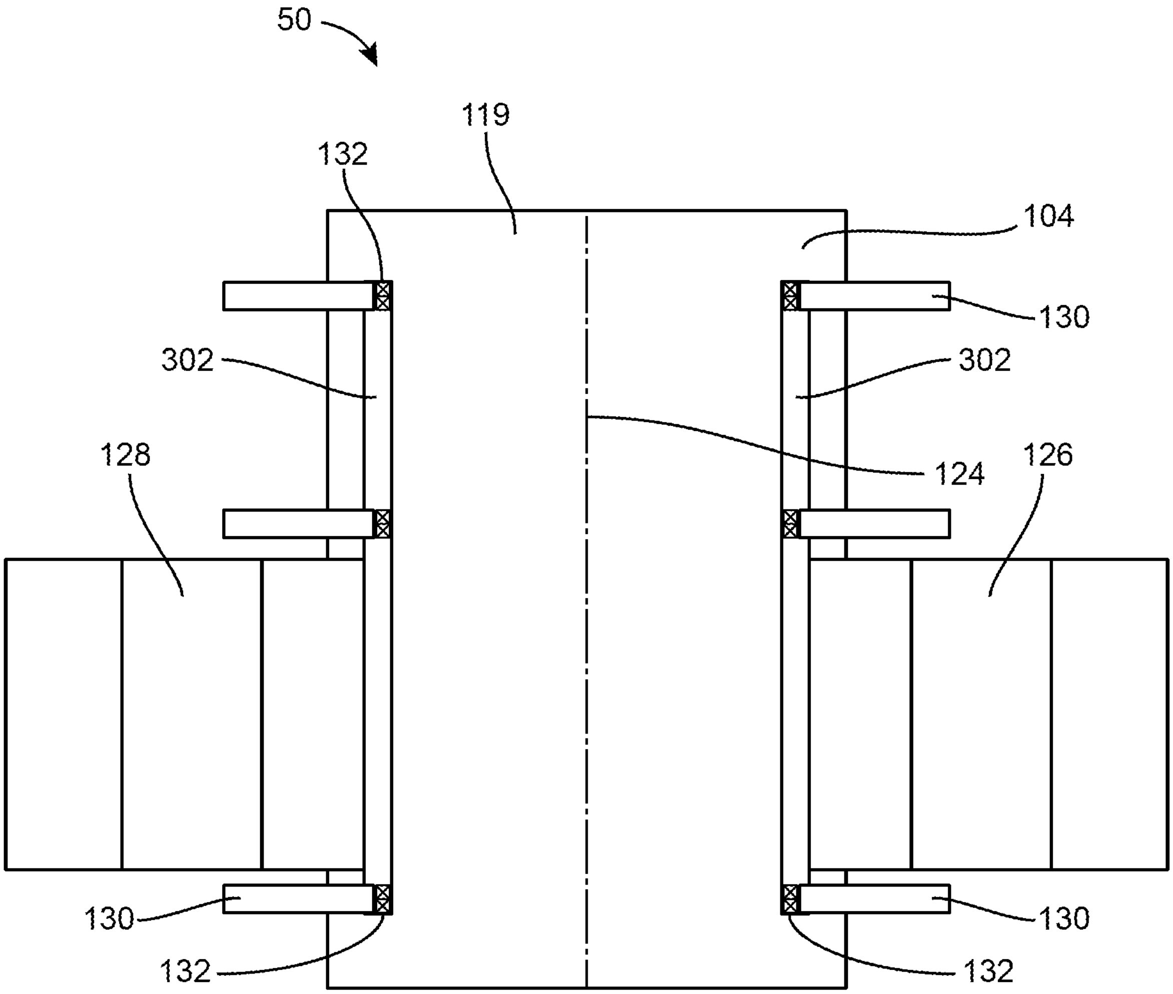
FIG. 3 is a bottom view of a high-friction pad of the patient positioning system of FIG. 1, according to an exemplary embodiment.

Referring now to FIG. 3, a bottom view of the high-friction pad 104 of the patient positioning system 50 is shown, according to an exemplary embodiment. In an exemplary embodiment, the high-friction pad 104 is the high-friction pad of FIG. 1. As shown in FIG. 3, the bottom pad surface 119 of the high-friction pad 104 includes counterpart connection strips 302.

According to an exemplary embodiment, the counterpart connection strips 302 are coupled to the bottom pad surface 119 via the stitching 132. In an exemplary embodiment, the counterpart connection strips 302 are made of hook and/or loop fasteners, and are configured to selectively couple the plurality of connection strips 214 of the inflatable body 210 (i.e., connect the bottom pad surface 119 of the high-friction pad 104 to the top surface 112 of the inflatable device 102).

For example, the counterpart connection strips 302 may be made of opposite hook and/or loop fasteners relative to the connection strips 214 (e.g., the counterpart connection strips 302 are made of a second member of a hook/loop fastener to couple a first member of the hook/loop fastener of the connection strips 214). Like the connection strips 214, in an exemplary embodiment the counterpart connection strips 302 extend the length of the high-friction pad 104 (e.g., from the head of the high-friction pad 104, down an edge, and to the foot). In some embodiments, the counterpart connection strips 302 are also coupled to the straps 130 (e.g., via the stitching 132). In other embodiments, the counterpart connection strips 302 are made of another suitable fastener (e.g., strings, snaps, hooks, loops, etc.), do not extend the full length of the high-friction pad 104, and/or have other configurations (e.g., extend along the head, foot, side edges, or any combination thereof). In yet other embodiments, the arm wraps 126 also include a counterpart connection fastener (e.g., a hook, a loop, a hook/loop opposite the counterpart connection strips 302, etc.), such that the arm wraps 126 couple (e.g., fasten, etc.) the counterpart connection strips 302, as discussed below.

Figure 4:
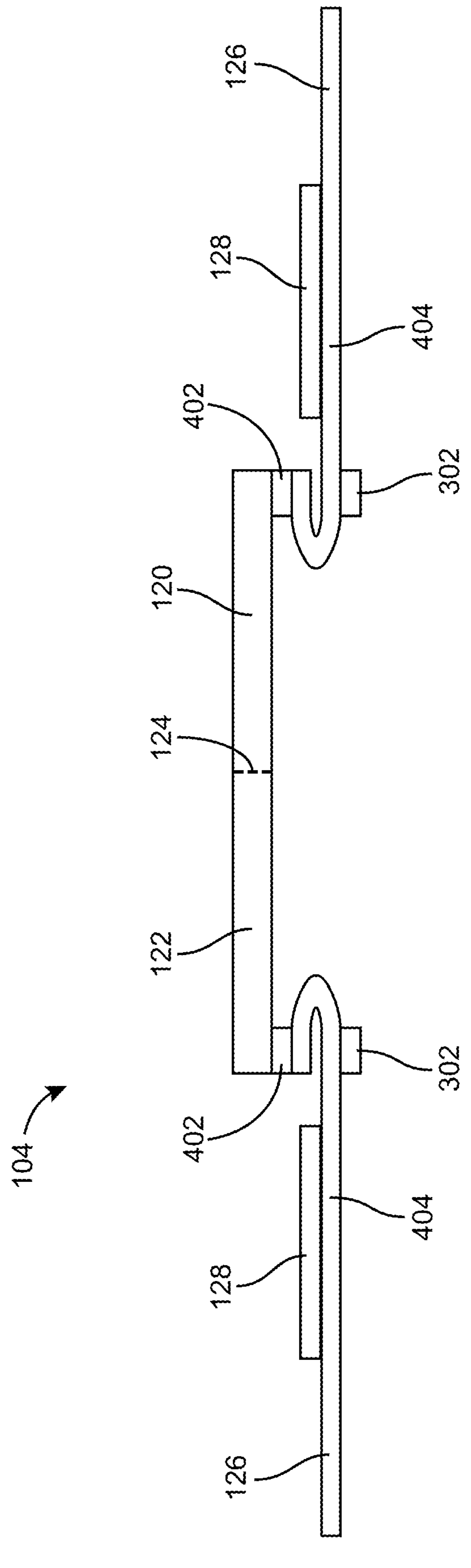
FIG. 4 is a partially exploded cross-sectional end view of a high-friction pad of the patient positioning system of FIG. 1, according to an exemplary embodiment.

Referring now to FIG. 4, a partially exploded cross-sectional end view of the high-friction pad 104 of the patient positioning system 50 is shown, according to an exemplary embodiment. In an exemplary embodiment, the high-friction pad 104 is the high-friction pad 104 of FIGS. 1 and 3.

As shown in FIG. 4, the high-friction pad 104 also includes arm wrap anchors 402. According to an exemplary embodiment, the arm wrap anchors 402 are fully integrated with the high-friction pad 104 (e.g., coupled, adhered, sewn, attached, etc.), and are positioned at a lateral side (e.g., an edge) of the high-friction pad 104. The arm wrap anchors 402 may be formed of any suitable fastening material, and may be configured to couple (e.g., fasten, etc.) the high-friction pad 104 and/or the arm wraps 126. In an exemplary embodiment, the arm wrap anchors 402 are hooks (e.g., a hook portion of a hook/loop fastener, etc.), and are configured to couple a portion of the arm wrap 126, so as to secure the arm wrap 126 to the high-friction pad 104. In some embodiments, the arm wrap anchors 402 are positioned in another suitable arrangement along the high-friction pad 104, include a plurality of arm wrap anchors 402, and/or are formed of another suitable fastening component (e.g., snap, clip, buckle, etc.).

As shown in FIG. 4, the arm wrap 126 also includes a first arm wrap surface 404. In an exemplary embodiment, the first arm wrap surface 404 includes (and/or is formed by) a loop material (e.g., loops of a hook/loop fastener, etc.), and is configured to couple components of the high-friction pad 104 (e.g., the arm wrap anchors 402, the counterpart connection strips 302, etc.). As shown in FIG. 4, the first arm wrap surface 404 is configured to couple (e.g., fasten, connect, etc.) the arm wrap anchor 402 at a first portion of the first arm wrap surface 404 (e.g., via the loops of the first arm wrap surface 404 and the hooks of the arm wrap anchor 402, etc.). The arm wrap 126 may be folded (e.g., bent, crimped, etc.), so as to orient the first portion of the first arm wrap surface 404 in a first direction (e.g., vertically upward), and a second portion of the first arm wrap surface 404 in a second direction (e.g., vertically downward). The counterpart connection strip 302 may then positioned so as to sandwich the first arm wrap surface 404 between the arm wrap anchor 402 (to which it is engaged) and the counterpart connection strip 302 (for coupling to the inflatable device 102), such that arm wrap 126 may be integrated with the high-friction pad 104. In an exemplary embodiment, the arm wrap anchors 402, the first arm wrap surface 404, and/or the counterpart connection strip 302 is/are reinforced (e.g., via stitching, stitching 132, etc.) at a position of the high-friction pad 104 where the arm wrap anchors 402, the first arm wrap surface 404, and/or the counterpart connection strip 302 is/are coupled. In some embodiments, the arm wrap anchors 402, the first arm wrap surface 404, and/or the counterpart connection strip 302 are reinforced via the stitching 132 at a position of the high-friction pad 104 where the straps 130 are integrated with the high-friction pad 104.

Figure 5:
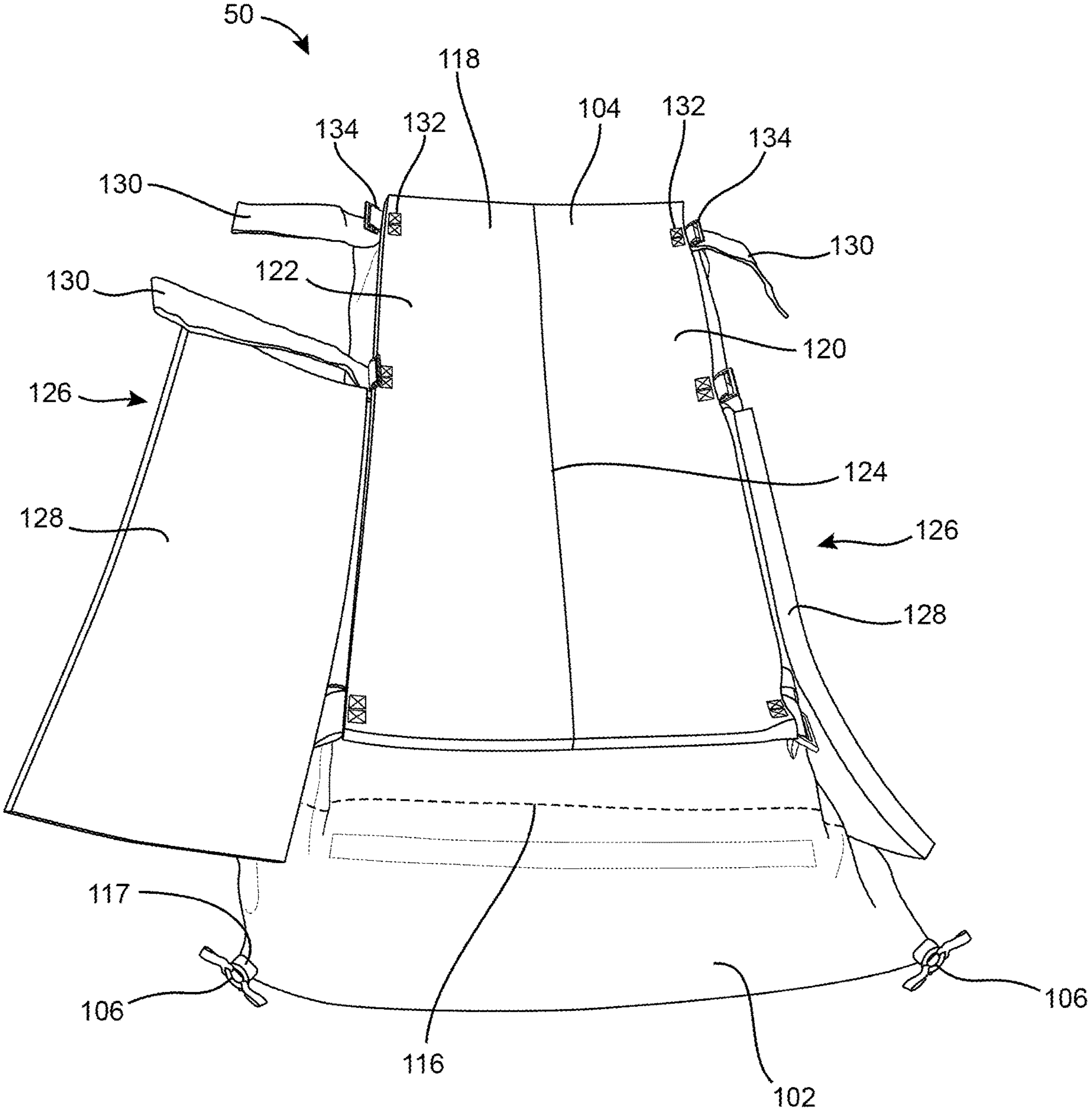
FIG. 5 is a top view of a high-friction pad of the patient positioning system of FIG. 1, according to another exemplary embodiment.
Figure 7:
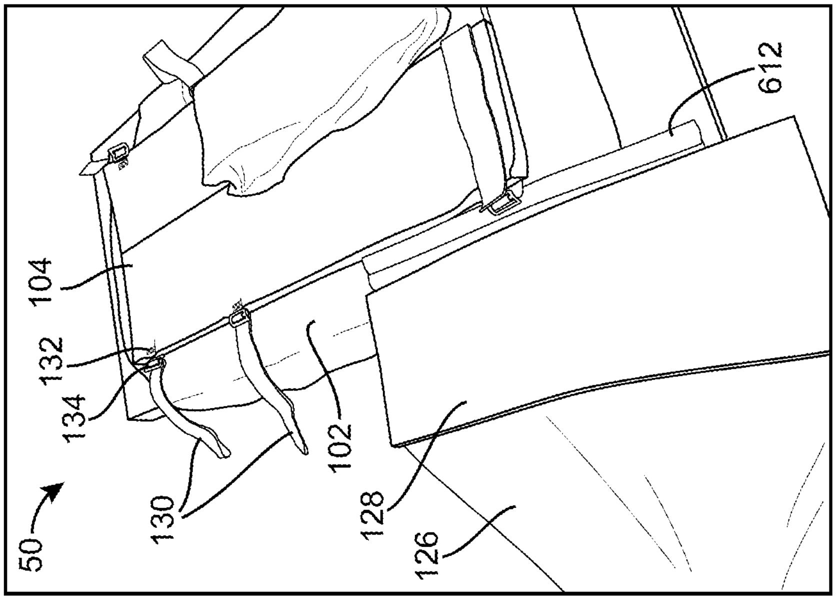
FIG. 7 is a top view of the high-friction pad of FIGS. 5-6, according to an exemplary embodiment.
Figure 6:
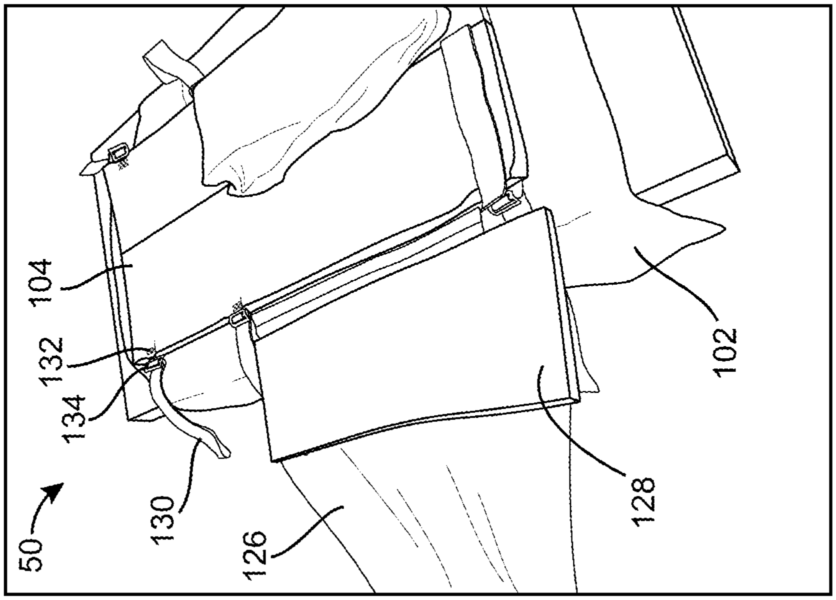
FIG. 6 is a top view of the high-friction pad of the patient positioning system of FIG. 5, according to an exemplary embodiment.

Referring now to FIGS. 5-7, top views of a high-friction pad 104 of the patient positioning system 50 is shown, according to another exemplary embodiment. The components of the high-friction pad 104 of FIGS. 5-7 are similar to components of the high-friction pad of FIGS. 1 and 3, and thus, similar reference numerals are used to refer to similar components. As shown in FIGS. 5-7, the high-friction pad 104 includes arm wraps 126 (each having at least one foam section 128), the straps 130, the stitching 132, and the buckles 134.

According to the exemplary embodiment of FIGS. 5-7, the arm wraps 126 are coupled to the high-friction pad 104 via hook/loop fasteners, and are configured to selectively couple/de-couple the high-friction pad 104 so as to be attachable/removable. In this regard, the arm wraps 126 may include a material having a fastening feature (e.g., hook/loop material, etc.), which may couple/de-couple a counterpart fastening feature (e.g., a loop/hook material, etc.) on the high-friction pad 104, as discussed below.

As shown in FIGS. 5-7, the arm wraps 126 are coupled to a middle portion of the high-friction pad 104, such that when the high-friction pad 104 supports a patient, the patient's arms lie near (or within) the arm wraps 126. In the exemplary embodiment shown in FIGS. 5 and 7, the arm wraps 126 are coupled to a middle (and lower) lateral portion of the high-friction pad 104, and extend beyond (e.g., below in a longitudinal direction) the high-friction pad 104 and/or the alignment line 116 of the inflatable device 102. In some embodiments, the arm wraps 126 are coupled to another portion of the high-friction pad 104 (e.g., upper, lower, medial, top, bottom, etc.), and/or are oriented in another configuration relative to the high-friction pad 104 and/or the inflatable device 102 (e.g., extend above the high-friction pad 104 in a longitudinal direction, extend above the alignment line 116, etc.).

As shown in FIGS. 5-7, the arm wraps 126 also include at least one foam section 128. According to the exemplary embodiment of FIGS. 5-7, the foam section 128 is approximately 25-30 inches in length (e.g., a length extending in a direction substantially parallel to the perforated separator 124, etc.) and/or approximately 10 inches in width (e.g., a width extending in a direction substantially perpendicular to the perforated separator 124), and is configured to completely cover the patient's hand and/or fingers when the patient's arm is within the arm wrap 126. In this regard, the foam section 128 may keep the patient's arms comfortable, safe, and secure during surgical procedures. It should be understood that while the foam section 128 is described as having certain lengths and/or widths, the foam section 128 may be another suitable length (e.g., 20, 22.5, 25, 27.5, 30, etc. inches) and/or width (e.g., 7.5, 8, 8.5, 9, 9.5, 10.5, 11, 11.5, 12, etc. inches), such that the foam section 128 is configured to cover (partially, completely, etc.) the patient's hand and/or fingers when the patient's arm is within the arm wrap 126.

As shown in FIGS. 5-7, the high-friction pad 104 also includes straps 130, which are coupled to the high-friction pad 104 by stitching 132. As discussed above, the straps 130 may be configured to secure the high-friction pad 104 to other components of the patient positioning system 50 (e.g., to the support structure 100, the inflatable device 102, etc.). According to the exemplary embodiment of FIGS. 5-7, the straps also include the buckles 134. The buckles 134 may be coupled (e.g., fastened, sewn, etc.) to the straps 130, and may be configured to receive (e.g., loop, hook, etc.) the straps 130 through an opening in the buckle 134. In an exemplary embodiment, the buckles 134 are coupled to the straps 130 a distance (e.g., 0.5, 1, 2, 2.5, 5, etc. inches) from an edge of the high-friction pad 104 (and/or the stitching 132, etc.), such that the buckles 134 are easily accessible when a patient is positioned on the high-friction pad 104. As discussed above, in other embodiments, the straps 130 and/or the buckles 134 comprise other fastening components (e.g., snaps, hooks, hook and loop fasteners, etc.), are coupled to other components of the high-friction pad 104 (e.g., a lateral side of the high-friction pad 104 itself, a connector strip, etc.), and/or are positioned at other suitable positions at the high-friction pad 104 (e.g., along the head, foot, at an edge of the high-friction pad 104, etc.).

Referring now to FIGS. 6-7, top views of the high-friction pad 104 of the patient positioning system 50 is shown, according to an exemplary embodiment. According to the exemplary embodiment of FIGS. 6-7, the arm wraps 126 also include a fastening strip 612, which is configured to selectively couple/de-couple the arm wrap 126 to/from the high-friction pad 104, such that the arm wraps 126 are attachable/removable.

According to an exemplary embodiment, the fastening strip 612 is positioned along a lateral edge of the arm wrap 126 (e.g., a lateral edge at the medial portion of the arm wrap 126), and extends substantially the length of the arm wrap 126. The fastening strip 612 may be formed of hook and/or loop fasteners, and may be configured to selectively couple/de-couple to/from components of the high-friction pad 104. For example, the fastening strip 612 may be formed of hook/loop fasteners, and may be configured to couple/de-couple counterpart loop/hook fasteners of a counterpart fastening strip 812 (shown in FIG. 8) of the high-friction pad 104. In the exemplary embodiment shown in FIG. 6, the fastening strip 612 is coupled to the counterpart fastening strip 812, such that the arm wrap 126 is positioned at a middle (and lower) lateral portion of the high-friction pad 104. In some instances, a user may want to remove the arm wrap 126 (e.g., for cleaning, transporting, etc.) and/or reposition the arm wrap 126 (e.g., for a different procedure, patient position, etc.). In this regard, and as shown in FIG. 7, the fastening strip 612 may de-couple the counterpart fastening strip 812 of the high-friction pad 104, and the arm wrap 126 may be removed and/or repositioned. It should be understood that the fastening strip 612 may be formed of different fastening mechanisms (e.g., strings, snaps, hooks, loops, etc.), may be positioned at other suitable locations along the arm wrap 126 (e.g., a bottom edge, top surface, bottom surface, only a portion of a lateral edge, etc.), and/or may be configured to couple/de-couple other components of the patient positioning system 50.

In some embodiments, the fastening strip 612 is formed of a hook/loop fastener on a first surface and an opposite loop/hook fastener on a second surface, such that the fastening strip 612 is configured to couple/de-couple components on the first surface and/or the second surface. For example, the fastening strip 612 may be formed of a hook fastener on the first surface, and a loop fastener on the second surface. The fastening strip 612 may further be configured to couple/de-couple a loop fastener at the first surface (e.g., a loop fastener of the counterpart fastening strip 812 of the high-friction pad 104, etc.), and/or a hook fastener at the second surface (e.g., a hook fastener of the connection strip 214 of the inflatable device 102, etc.).

Figure 8:
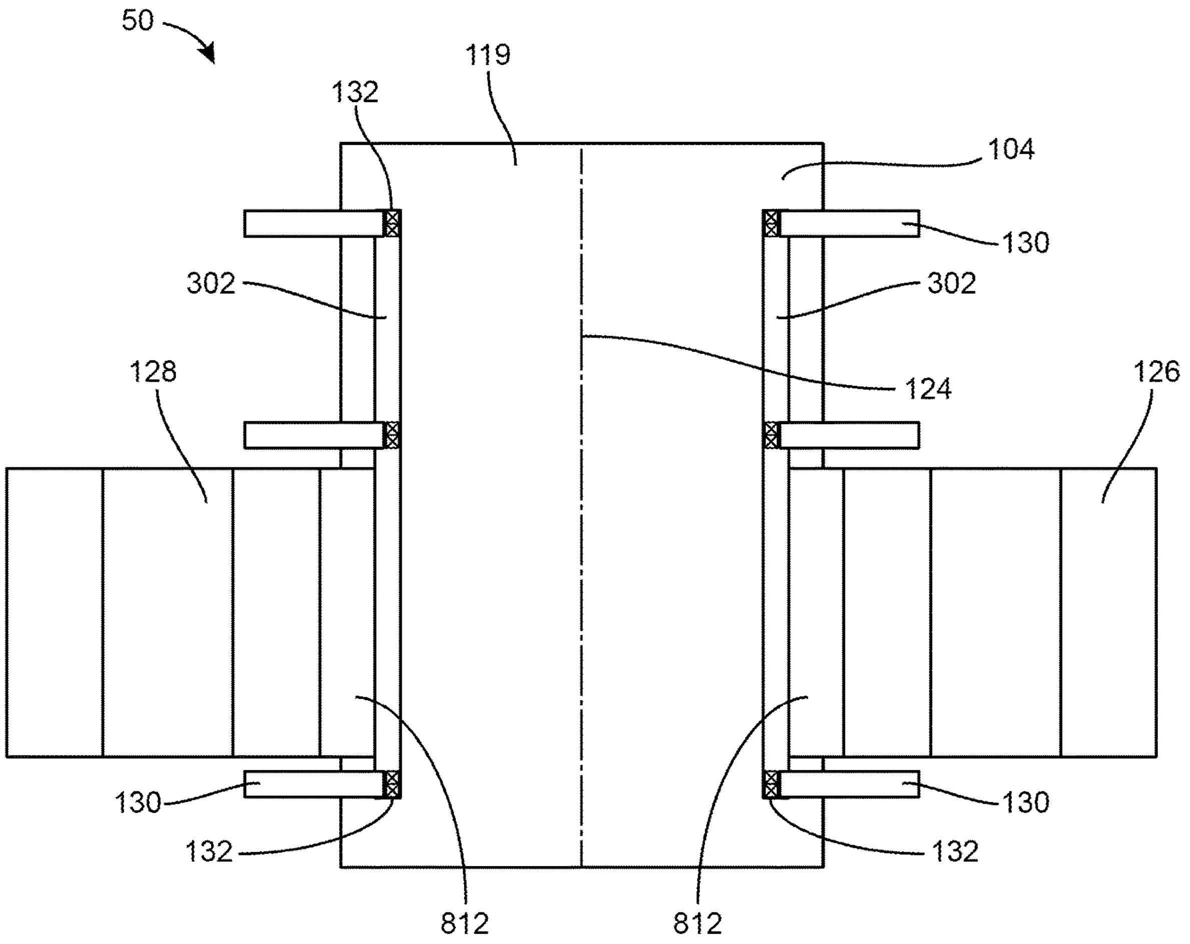
FIG. 8 is a bottom view of the high-friction pad of FIGS. 5-7, according to an exemplary embodiment.

Referring now to FIG. 8, a bottom view of the high-friction pad 104 of the patient positioning system 50 is shown, according to an exemplary embodiment. In an exemplary embodiment, the high-friction pad 104 is the high-friction pad of FIGS. 5-7. As shown in FIG. 8, the bottom pad surface 119 of the high-friction pad 104 includes a counterpart fastening strip 812 and/or a counterpart connection strip 302.

As shown in FIG. 8, the bottom pad surface 119 includes the counterpart fastening strip 812 (or a plurality thereof). The counterpart fastening strip 812 may be positioned along a lateral edge of the bottom pad surface 119, and/or at a middle (and lower) portion of the bottom pad surface 119, and may couple the bottom pad surface 119 via any suitable coupling mechanism (e.g., stitching, adhesive, etc.). According to an exemplary embodiment, the counterpart fastening strip 812 extends laterally (e.g., a direction substantially perpendicular to the perforated separator 124) a distance from the high-friction pad 104, and is formed of a counterpart hook/loop fastener relative to the fastening strip 612 of the arm wrap 126 (e.g., a second member of a hook/loop fastener to couple a first member of the hook/loop fastener of the fastening strip 612). In this regard, the counterpart fastening strip 812 is configured to selectively couple/de-couple the fastening strip 612, such that the high-friction pad 104 may be coupled/de-coupled to/from the arm wraps 126. It should be understood that in some embodiments, the counterpart fastening strip 812 is formed of different fastening mechanisms (e.g., strings, snaps, hooks, loops, etc.), is in another suitable orientation relative to the high-friction pad 104 (e.g., does not extend laterally a distance, is at an edge, etc.), and/or is positioned at another suitable location on the bottom pad surface 119 (e.g., a head portion, a foot portion, a medial portion, etc.). Further, in some embodiments the counterpart fastening strip 812 is integrated with other components of the high-friction pad 104 (e.g., the counterpart connection strip 302, etc.).

In some embodiments, the counterpart fastening strip 812 is formed of a hook/loop fastener on a first surface and an opposite loop/hook fastener on a second surface. Similar to the fastening strip 612 discussed above, the counterpart fastening strip 812 may be configured to couple/de-couple components on the first surface and/or the second surface. For example, the counterpart fastening strip 812 may be formed of a hook fastener on the first surface, and a loop fastener on the second surface. The counterpart fastening strip 812 may further be configured to couple/de-couple loop fastener(s) on the first surface (e.g., a loop fastener of the fastening strip 612 of the arm wrap 126, a loop fastener of the counterpart connection strip 302 of the high-friction pad 104, etc.), and/or a hook fastener at the second surface (e.g., a hook fastener of the connection strip 214 of the inflatable device 102, etc.).

As shown in FIG. 8, the bottom pad surface 119 also includes the counterpart connection strip 302 (or a plurality thereof). The counterpart connection strip 302 may extend along a lateral edge of the high-friction pad 104, and may be coupled to the bottom pad surface 119 (and/or the straps 130) via the stitching 132. According to an exemplary embodiment, the counterpart connection strip 302 is formed of a counterpart hook/loop fastener relative to the connection strip 214 of the inflatable device 102 (e.g., a second member of a hook/loop fastener to couple a first member of the hook/loop fastener of the connection strip 214). In this regard, the counterpart connection strip 302 is configured to selectively couple/de-couple the connection strip 214, such that the high-friction pad 104 may be coupled/de-coupled to/from the inflatable device 102. It should be understood that in some embodiments, the counterpart connection strip 302 is formed of different fastening mechanisms (e.g., strings, snaps, hooks, loops, etc.), and/or is positioned at other suitable locations on the bottom pad surface 119 (e.g., at the head, foot, a medial portion, extend along a portion of the bottom pad surface 119, etc.).

In some embodiments, the counterpart connection strip 302 is integrated with the counterpart fastening strip 812. In this regard, the counterpart connection strip 302 and the counterpart fastening strip 812 may form a unified counterpart strip, which may extend the length of the high-friction pad 104 and/or couple/de-couple other components of the patient positioning system 50 (e.g., the arm wrap 126, the inflatable device 102, etc.). In yet other embodiments, the counterpart connection strip 302 (and/or the counterpart fastening strip 812) is also aligned with other components of the high-friction pad 104 (e.g., the fastening strip 612 of the arm wrap 126). As discussed above, in some embodiments the fastening strip 612 is formed of hook/loop fasteners, and includes a first surface (e.g., a hook fastener) and a second surface (e.g., a loop fastener). The first surface of the fastening strip 612 (e.g., the hook fastener) may couple to the counterpart fastening strip 812 (e.g., a loop fastener), and the second surface (e.g., the loop fastener) may be substantially aligned with the counterpart connection strip 302 (and the counterpart fastening strip 812). In this regard, the counterpart connection strip 302 and the second surface of the fastening strip 612 may align, so as to form a counterpart strip (e.g., a loop fastener strip), and may be configured to selectively couple/de-couple the connection strip 214 of the inflatable device 102. In some embodiments, the counterpart strip (e.g., the counterpart connection strip 302, the counterpart fastening strip 812, the second surface of the fastening strip 612, etc.) is configured to couple/de-couple other components of the patient positioning system 50 (e.g., a body pad, a surface, etc.).

Figure 9:
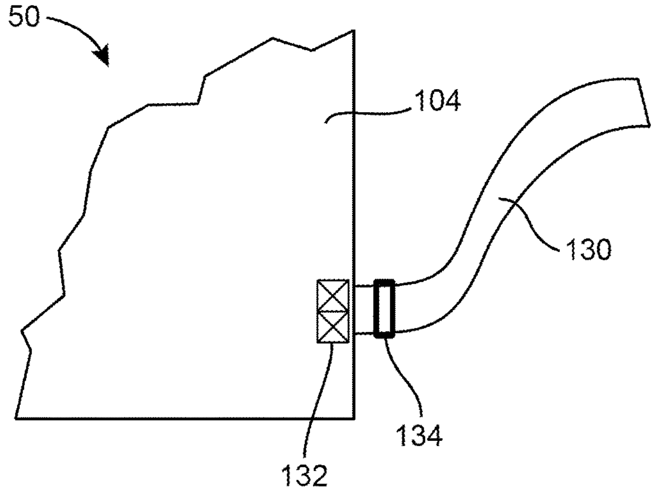
FIG. 9 is a top view of a portion of a high-friction pad of the patient positioning system of FIG. 1, according to an exemplary embodiment.

Referring now to FIG. 9, a top view of a portion of the high-friction pad 104 of the patient positioning system 50 is shown, according to an exemplary embodiment. As mentioned with regard to FIGS. 1-8, the high-friction pad 104 includes the strap 130, the stitching 132, and the buckle 134. In an exemplary embodiment, the strap 130 is formed of a combination hook/loop material at least at a portion of the strap 130 (e.g., on at least one side of the strap 130), and is integrated with the high-friction pad 104 via the stitching 132 (e.g., double boxed stitching, etc.). In an exemplary embodiment, the buckle 134 is coupled (e.g., fastened, sewn, etc.) to the strap 130 a distance from the high-friction pad 104 (and/or the stitching 132, etc.) so as to be accessible, and is configured to receive (e.g., loop, hook, etc.) the strap 130. In some embodiments, the buckle 134 is integrated (e.g., coupled, sewn, etc.) with the high-friction pad 104, and is configured to receive the strap 130. According to an exemplary embodiment, the strap 130 is configured to couple an anchor (e.g., loop under an anchor on the support structure 100, an external rail, loop around, etc.), pass through the buckle 134 (e.g., loop under and through the buckle 134, hook around the buckle 134, couple the buckle 134, etc.), and couple to itself (e.g., the strap 130 via the hook/loop material, etc.). In this regard, the strap 130 may engage (e.g., loop around) components of the patient positioning system 50 and/or couple components of the patient positioning system 50 (e.g., the buckle 134, the strap 130 itself, etc.), such that the strap 130 secures the high-friction pad 104 to the support structure 100, the inflatable device 102, and/or another suitable device (e.g., an external rail, etc.).

Figure 10:
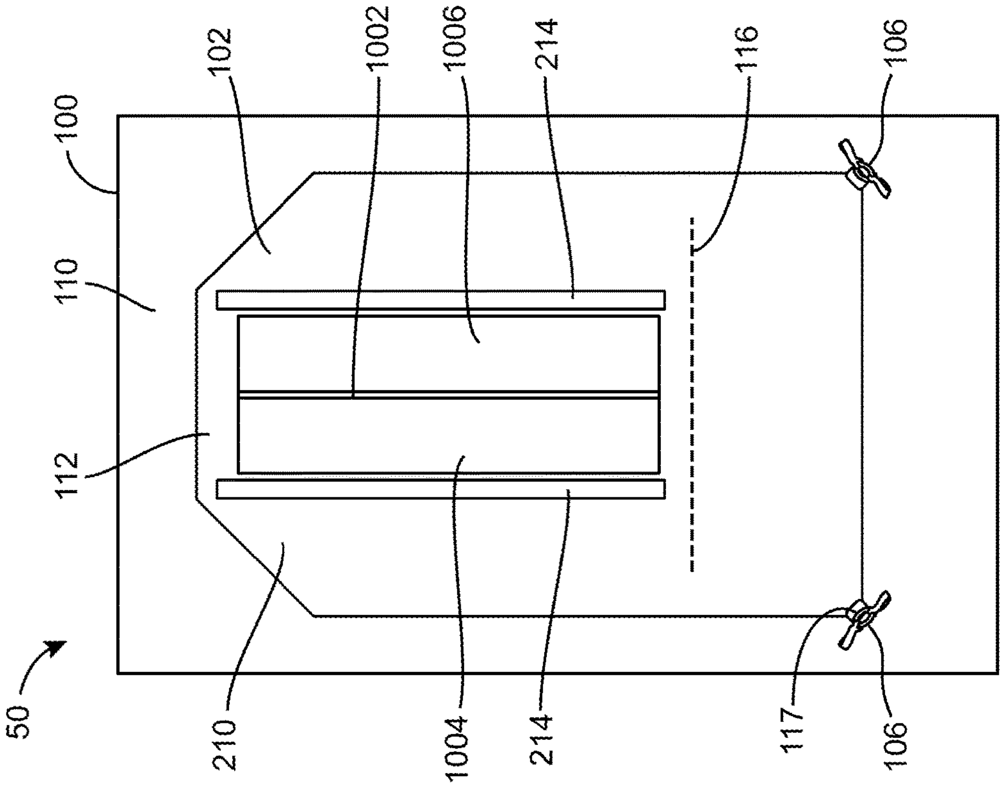
FIG. 10 is a top view of the patient positioning system of FIG. 1, according to an exemplary embodiment.
Figure 11:
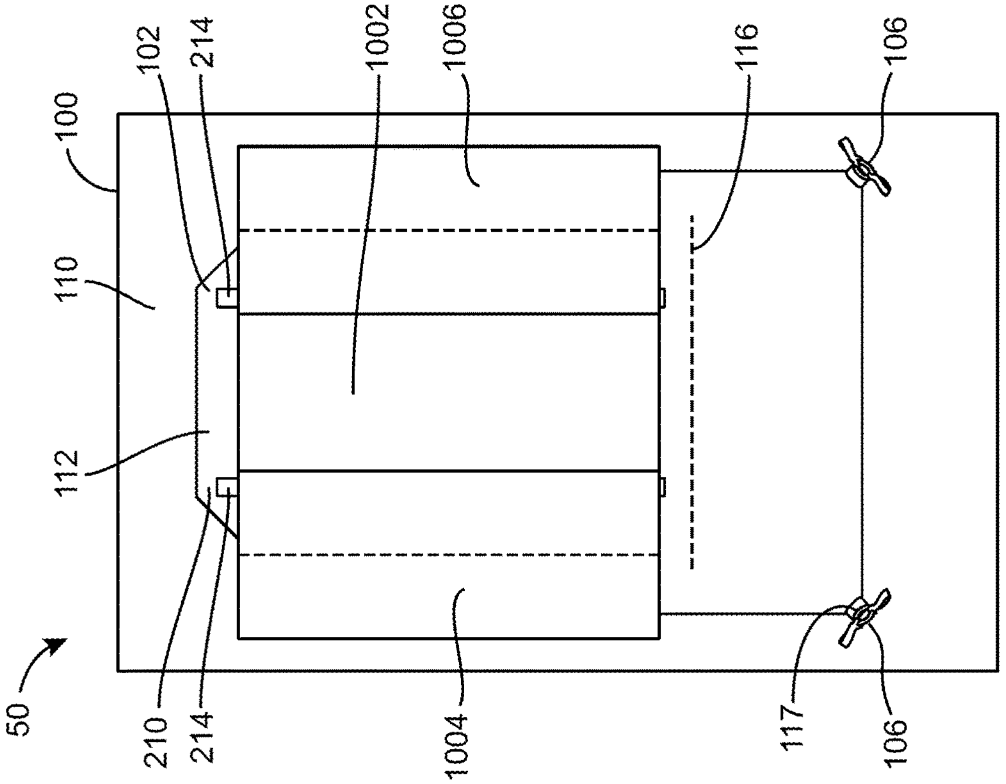
FIG. 11 is another top view of the patient positioning system of FIG. 1, according to an exemplary embodiment.

Referring now to FIGS. 10-11, top views of the inflatable device 102 and a microclimate body pad (hereinafter "body pad 1002") of the patient positioning system 50 is shown, according to an exemplary embodiment. In an exemplary embodiment, the body pad 1002 is configured to lay under components of the patient positioning system 50 and/or a patient while the inflatable device 102 is used for a number of different medical and/or patient care uses. As will be discussed in greater detail below, in an exemplary embodiment the body pad 1002 is positioned on the top surface 112 of the inflatable device 102 between other components and/or a patient.

As shown in FIGS. 10-11, the body pad 1002 is configured to have a folded configuration and an unfolded configuration (e.g., is configured to be folded/unfolded). As shown in FIG. 10, in a folded configuration the body pad 1002 is folded/compact, such that the body pad 1002 may be compact and/or positioned between the inflatable device 102 and the high-friction pad 104. Conversely, as shown in FIG. 11, in an unfolded configuration the body pad 1002 is unfolded/open, such that the body pad 1002 may be positioned between the inflatable device 102 and a patient. According to an exemplary embodiment, the body pad 1002 is a dual z-fold design, as shown in the end view of FIG. 12.

Figure 12:
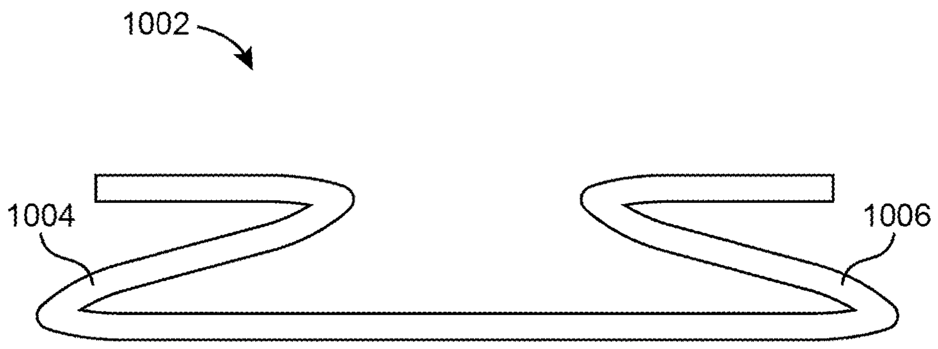
FIG. 12 is a cross-sectional end view of a body pad of the patient positioning system of FIG. 1, according to an exemplary embodiment.

As shown in FIGS. 10-12, the body pad 1002 has a first z-fold 1004 and a second z-fold 1006. The first z-fold 1004 and the second z-fold 1006 are configured to fold/unfold in laterally opposing directions. In an exemplary embodiment, the first z-fold 1004 and the second z-fold 1006 are folded by manipulating (e.g., moving, folding, positioning, etc.) the first z-fold 1004 and the second z-fold 1006 toward the center of the body pad 1002. Conversely, the first z-fold 1004 and the second z-fold 1006 may be unfolded by manipulating (e.g., moving, folding, positioning, pulling, etc.) a first side edge of the body pad 1002 in a first lateral direction and a second side edge of the body pad 1002 in a second (e.g., opposite) lateral direction, such that the first z-fold 1004 and the second z-fold 1006 are open and the body pad 1002 is a single layer. In some embodiments, the body pad 1002 is of another suitable design configured to be folded, for example a half fold, bi-fold, tri-fold, accordion fold, roll fold, gate fold, double parallel fold, double gate fold, etc. In yet other embodiments, the body pad 1002 is not folded.

In some embodiments, the body pad 1002 also includes connection areas that are configured to selectively couple components of the patient positioning system 50. For example, the body pad 1002 may include a connection area on a bottom surface of the body pad 1002, which may selectively couple/de-couple the connection strips 214 of the inflatable device 102. Similarly, the body pad 1002 may include connection areas on the first z-fold 1004 and/or the second z-fold 1006, which may selectively couple/de-couple the counterpart connection strips 302 of the high-friction pad 104. In this regard, when the body pad 1002 is in a folded configuration, the connection areas may selectively couple the inflatable device 102 (e.g., the connection strips 214, etc.) and/or the high-friction pad 104 (e.g., the counterpart connection strips 302, etc.), such that the body pad 1002 is securely positioned between the inflatable device 102 and the high-friction pad 104. Similarly, when the body pad 1002 is in an unfolded configuration, the connection areas may selectively couple the inflatable device 102 (e.g., the connection strips 214, etc.), such that the body pad is securely positioned on the inflatable device 102 and beneath the patient.

Figure 13:
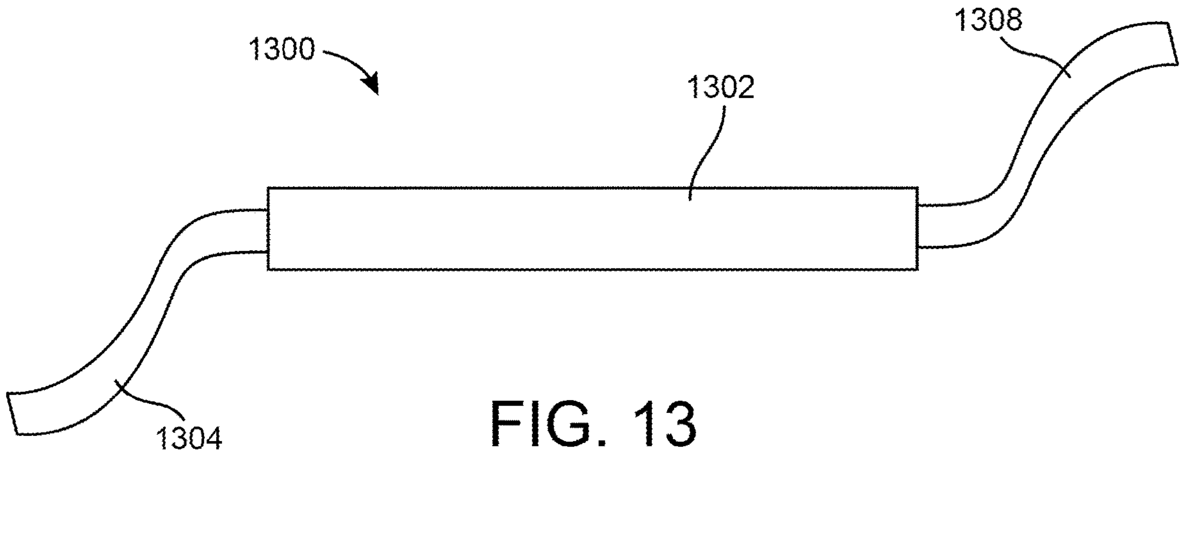
FIG. 13 is a top view of a chest strap of the patient positioning system of FIG. 1, according to an exemplary embodiment.

Referring now to FIG. 13, a chest strap of the patient positioning system 50 is shown, according to an exemplary embodiment. The chest strap 1300 includes a base portion 1302, a first end portion 1304, and a second end portion 1308. According to an exemplary embodiment, the chest strap 1300 is formed of any suitable flexible and/or breathable material (e.g., polyester, cotton, etc.), and is be configured to be elongated along (e.g., across) a patient and/or a surface (e.g., a sheet, bed, support surface, etc.). In an exemplary embodiment, components of the chest strap 1300 are also formed of a suitable fastening material (e.g., a hook/loop material, an adhesive material, etc.). For example, the base portion 1302 may be formed of a loop material (e.g., loops of a hook/loop fastener), and the first end portion 1304 and the second end portion 1308 may formed of a hook material (e.g., hooks of a hook/loop fastener, etc.).

According to an exemplary embodiment, components of the chest strap 1300 are configured to be manipulated (e.g., moved, pulled, repositioned, etc.), such that the chest strap 1300 is positioned across the chest of a patient and secures the patient within the patient positioning system 50. For example, the first end portion 1304 may be configured to be repositioned in a first direction and couple a first anchor (e.g., loop under an external rail, around a post, etc.), and the second end portion 1308 may be configured to be repositioned in a second (e.g., opposite) direction and couple a second anchor (e.g., loop under an external rail, around a post, etc.). Once the chest strap 1300 (e.g., the first end portion 1304, the second end portion 1308, etc.) is coupled to the anchor(s), the first end portion 1304 may be coupled (e.g., fasten) to the base portion 1302, and/or the second end portion 1308 may be coupled (e.g., fasten) to the base portion 1302, for example via the hooks/loops of the hook/loop fastening materials. In this regard, the chest strap 1300 may couple external anchors (e.g., external rails, posts, supports, etc.) by fastening to itself, so as to secure the patient within the patient positioning system 50. The chest strap 1300 may be further manipulated (e.g., tightened, loosened, etc.) via the coupling(s) between the end portions 1404, 1408 and the base portion 1302, such that the chest strap 1300 may adequately secure the patient within the patient positioning system 50.

Referring now to FIGS. 14-18, a process of using the patient positioning system 50 is shown, according to an exemplary embodiment. The processes described in FIGS. 14-18 may utilize the components of the patient positioning system 50 described in FIGS. 1-13.

Figure 14:
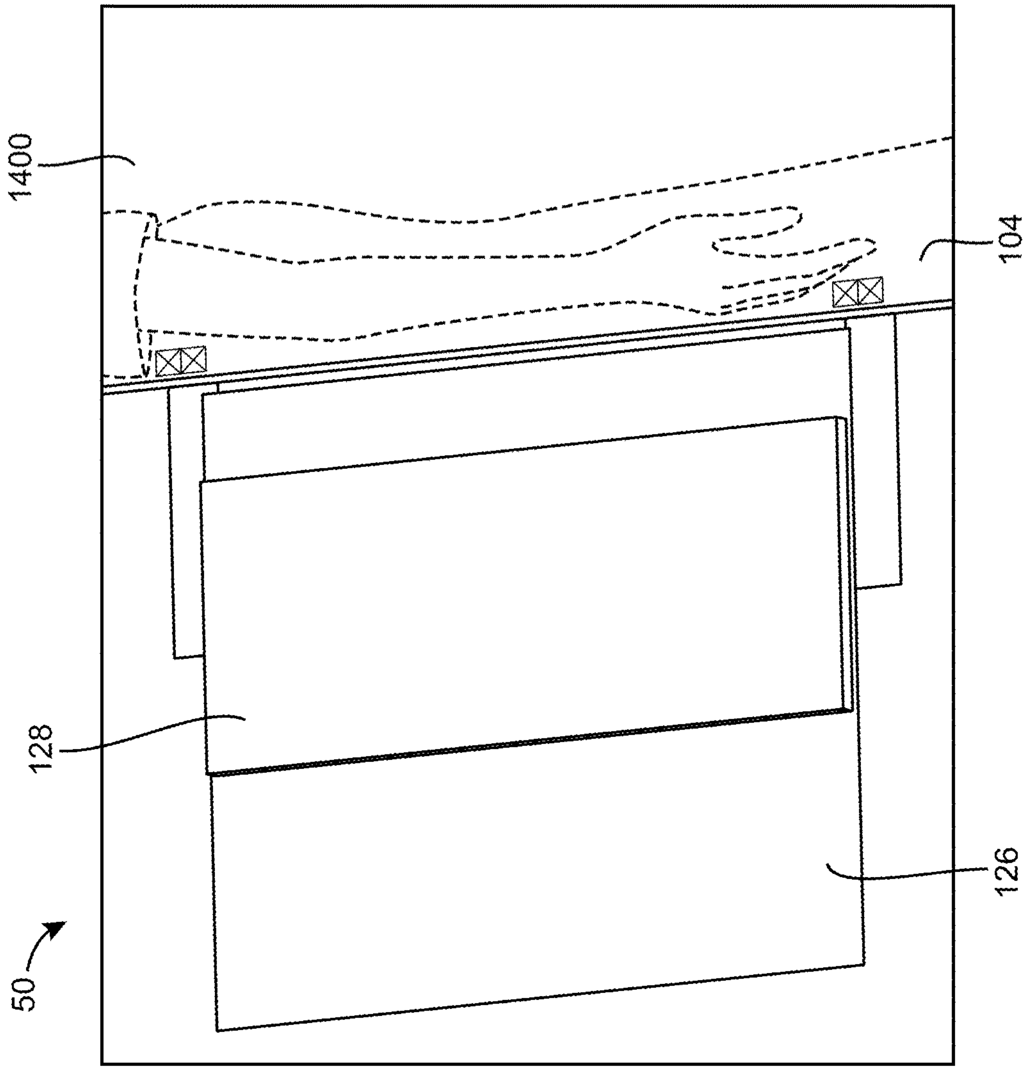
FIG. 14 is a view of the patient positioning system of FIG. 1 in use with a patient, according to an exemplary embodiment.

Referring to FIG. 14, a patient positioned in the patient positioning system 50 is shown, according to an exemplary embodiment. As shown in FIG. 14, the arm of a patient 1400 may be positioned on the exterior edge of the high-friction pad 104, near the arm wrap 126. The arm wrap 126 may extend (e.g., open, unfold, unroll, etc.) laterally from the high-friction pad 104 (e.g., away from the midline of the patient 1400). As shown in FIG. 14, the arm wrap 126 (and the foam section 128) is positioned such that the arm wrap 126 is configured to cushion, support, and/or secure the patient 1400, for example, the arm wrap 126 is positioned under the patient's arm. In some embodiments, the arm wrap 126 is positioned between the patient's arm and torso, and/or above the patient's arm. In an exemplary embodiment, the healthcare provider positions the patient 1400 (e.g., the patient's arm), such that when the arm wrap 126, the patient 1400, and/or both are repositioned, the foam section 128 rests on the lateral and top side of the patient's arm.

Figure 15:
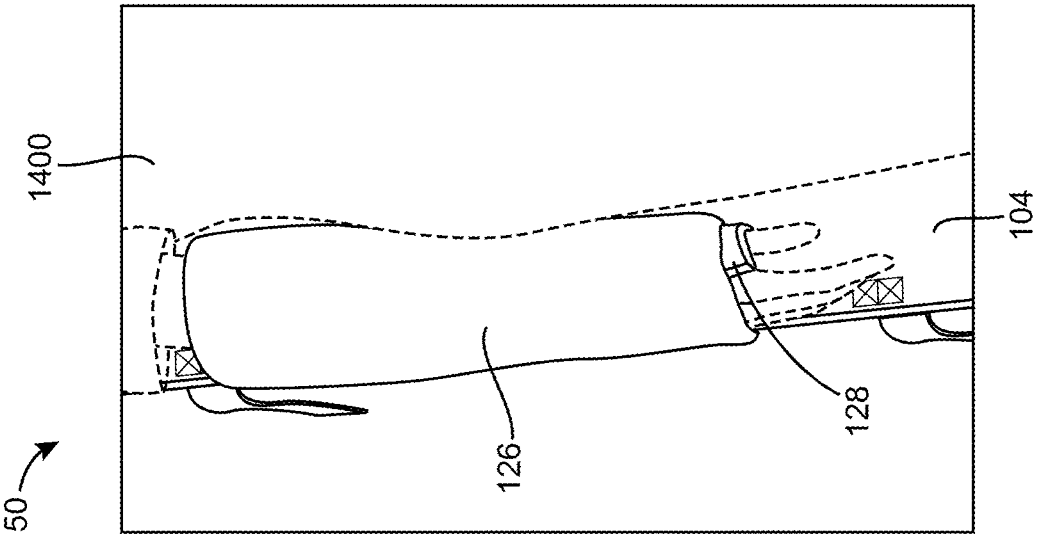
FIG. 15 is another view of the patient positioning system of FIG. 1 in use with a patient, according to an exemplary embodiment.

Referring now to FIG. 15, the patient positioning system 50 is shown in use, according to an exemplary embodiment. With the arm wrap 126 extended laterally from the high-friction pad 104 (e.g., away from the midline of the patient 1400), the patient's arm may be positioned on top of the arm wrap 126. The arm wrap 126 may then be moved over the lateral side of the patient's arm and back toward the high-friction pad 104 (e.g., toward the patient's midline), such that the patient's arm is wrapped in the arm wrap 126. As shown in FIG. 15, the arm wrap 126 is positioned under the patient's arm, wrapped around the lateral side of the patient's arm, and positioned between the patient's arm and the patient's torso. In an exemplary embodiment, the arm wrap 126 (e.g., the exterior portion of the arm wrap 126) is further positioned (e.g., tucked) under the patient's torso. In this regard, when the arm wrap 126 is wrapped around the arm of the patient 1400, and positioned under the patient's torso, the weight of the patient 1400 may secure and support the arm wrap 126, the arm of the patient 1400, and/or the patient 1400. In other embodiments, the arm wrap 126 includes additional fasteners (e.g., hook and loop fasteners) such that the arm wrap 126 further connects to other components of the patient positioning system 50 (e.g., other portions of the arm wrap 126, the high-friction pad 104, the inflatable device 102, etc.). In an exemplary embodiment, when the arm wrap 126 is in position (e.g., under the patient's arm, wrapped around the patient's arm, and positioned between the patient's arm and body, etc.), the arm wrap 126 (and/or the foam section 128) covers (completely, partially, etc.) the patient's arm, hand, and/or fingers.

In some embodiments, after the arm wrap 126 is extended laterally from the high-friction pad 104, the arm wrap 126 is moved between the patient's arm and the patient's torso, such that the arm wrap 126 is positioned on top of the patient's arm. An exterior portion of the arm wrap 126 may be moved about the lateral side of the patient's arm (e.g., under the patient's arm) and back toward the high-friction pad 104 (e.g., toward the patient's midline), such that the patient's arm is wrapped in the arm wrap 126. The arm wrap 126 may be tucked under a support structure (e.g., the support structure 100, a bed, mattress, etc.), such that the arm wrap 126 is secured, and the arm wrap 126, the arm of the patient 1400, and/or the patient 1400 is/are supported. In an exemplary embodiment, when the arm wrap 126 is in position (e.g., over top of the patient's arm, wrapped around the patient's arm, and tucked under a support structure, etc.), the arm wrap 126 (and/or the foam section 128) covers (completely, partially, etc.) the patient's arm, hand, and/or fingers.

Figure 16:
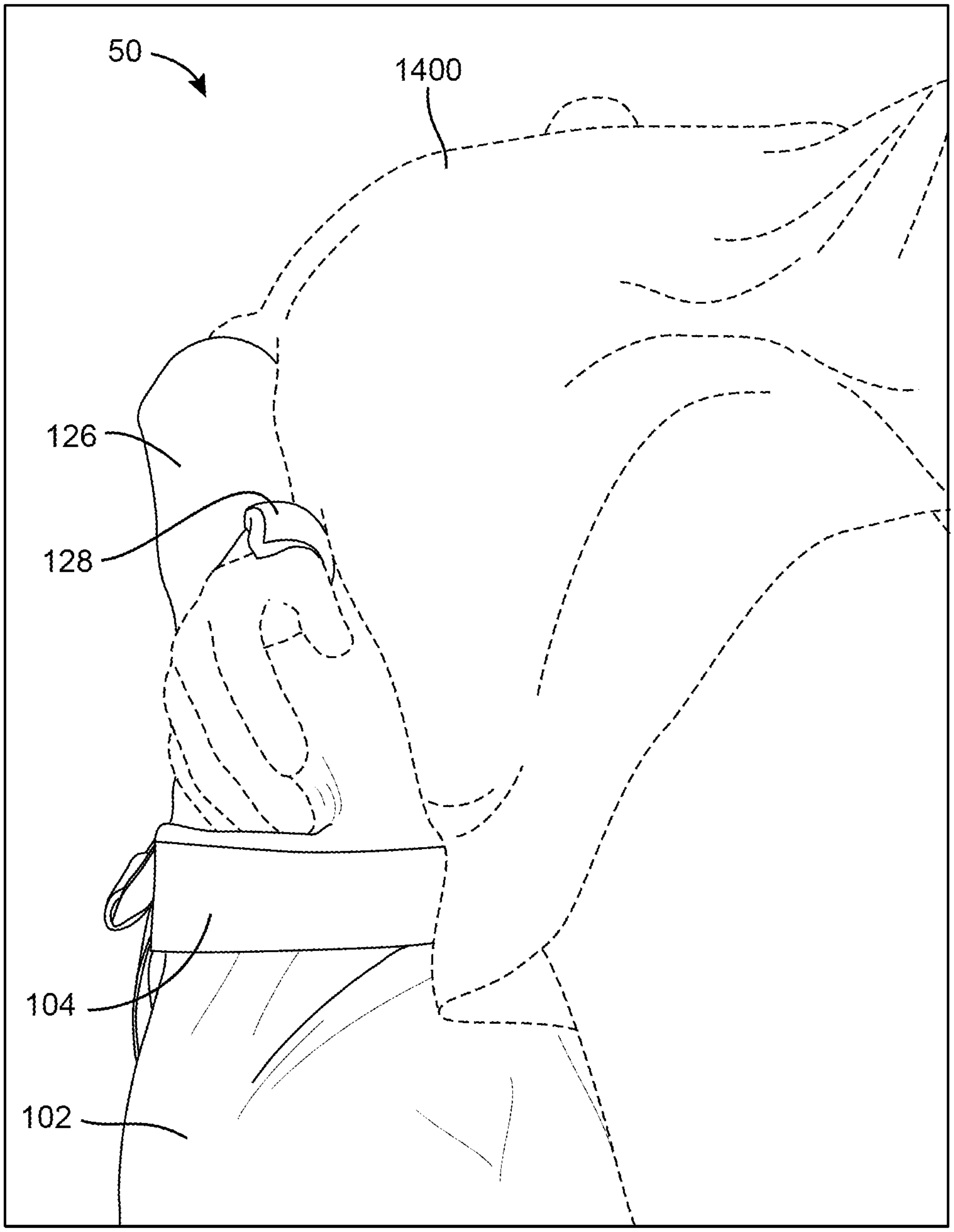
FIG. 16 is another view of the patient positioning system of FIG. 1 in use with a patient, according to an exemplary embodiment.

Referring now to FIG. 16, another view of the patient positioning system 50 in use is shown, according to an exemplary embodiment. As shown in FIG. 16, the arm wrap 126 is wrapped around the arm of the patient 1400 (e.g., the lateral side of the patient's arm), moved between the patient's arm and the patient's torso, and positioned (e.g., tucked) under the patient's torso (as discussed with regard to FIGS. 14-15). In an exemplary embodiment, when the patient 1400 is in position in the patient positioning system 50, the foam section 128 (of the arm wrap 126) is positioned on the lateral and topside of the patient's arm. In this regard, the foam section 128 may provide cushion, support, and/or secure the patient's arm so as to prevent unwanted movement (e.g., keep the patient's arm adducted, out of the way of operating room staff, etc.), and prevent potential injury (e.g., burns, cuts, pressure-related injuries, nerve damage, etc.). In other embodiments, the patient 1400 (e.g., the patient's arm) is positioned in the patient positioning system 50 such that the patient's arm is positioned in the arm wrap 126 (and the foam section 128) in a way that is desirable for the different positions required by surgical procedures and patient care, as discussed above.

Figure 17:
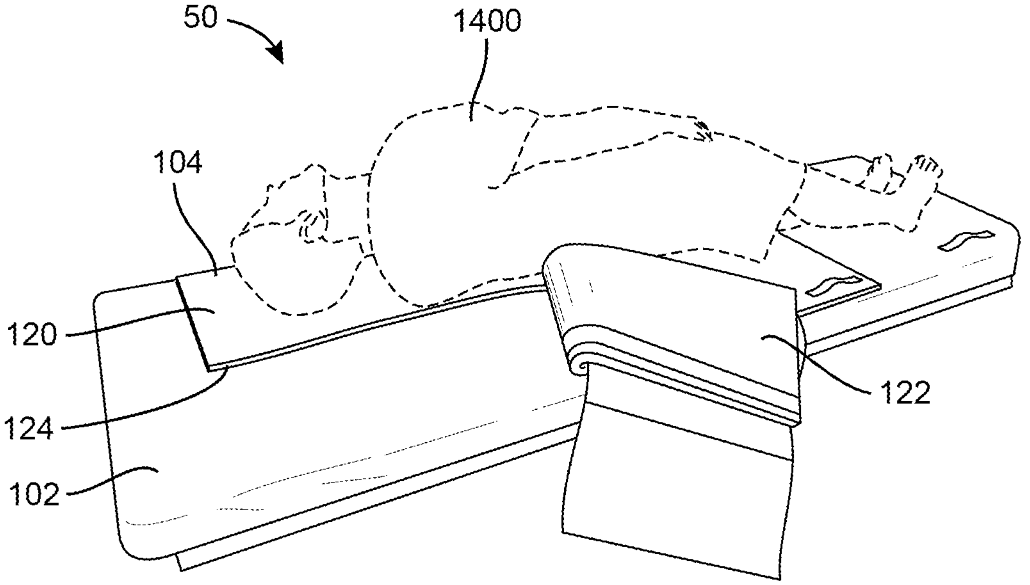
FIG. 17 is a view of positioning a patient with the patient positioning system of FIG. 1, according to an exemplary embodiment.
Figure 18:
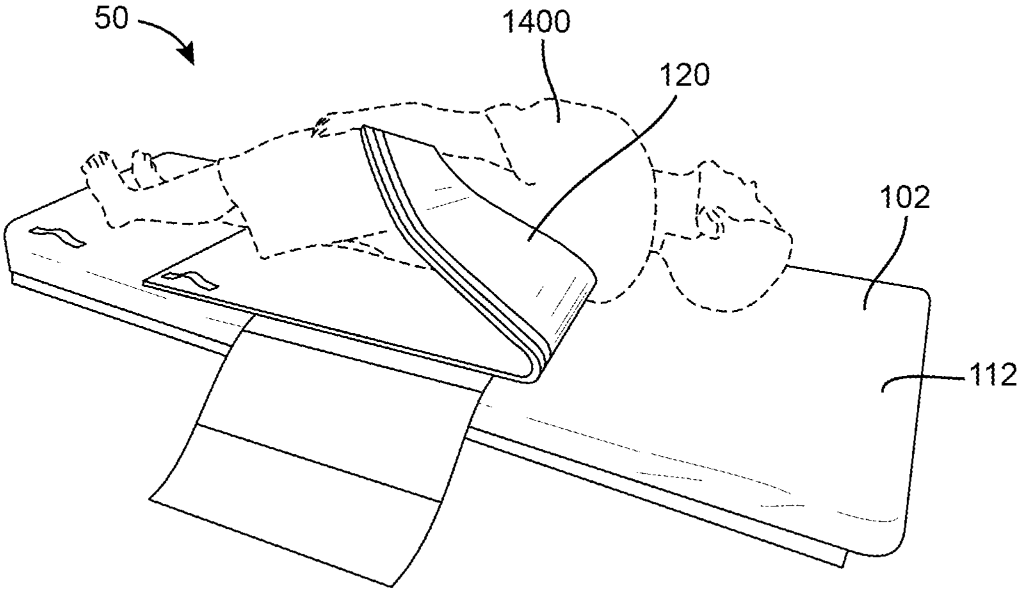
FIG. 18 is another view of positioning a patient with the patient positioning system of FIG. 1, according to an exemplary embodiment.

Referring now to FIGS. 17-18, a process of repositioning a patient on the patient positioning system 50 is shown, according to an exemplary embodiment. The processes described in FIGS. 17-18 may utilize the components of the patient positioning system 50 described in FIGS. 1-13.

Referring to FIG. 17, a patient on the patient positioning system 50 is shown, according to an exemplary embodiment. As discussed above with regard to FIG. 1, when the high-friction pad 104 is positioned on the inflatable device 102, the patient 1400 may rest on top of the high-friction pad 104. In some situations, it may be desirable for a healthcare provider to remove the high-friction pad 104 (or a portion of thereof) so that the patient 1400 may rest on top of the inflatable device 102, the body pad 1002, and/or a smaller portion of the high-friction pad 104. In this regard, the perforated separator 124 (which divides the first pad section 120 and the second pad section 122) may allow a healthcare provider to remove the high-friction pad 104 (or a portion thereof) while in use with the patient 1400. As shown in FIG. 17, to remove the high-friction pad 104 (or a portion thereof), the patient 1400 may be rolled onto their side (e.g., such that the patient lies entirely on the first pad section 120). The healthcare provider may then rip, cut, tear, or otherwise manipulate the high-friction pad 104 (e.g., along the perforated separator 124) to remove the second pad section 122. In some embodiments, the patient 1400 remains on the first pad section 120.

Referring now to FIG. 18, another view of the patient 1400 on the patient positioning system 50 is shown, according to an exemplary embodiment. As mentioned above with regard to FIG. 1, in some situations the healthcare provider may want to reposition the patient 1400 multiple times. As shown in FIG. 18, following the process described in FIG. 17, the healthcare provider may gently roll the patient 1400 to the other side (e.g., where the second pad section 122 was removed), such that the patient 1400 lies entirely on the inflatable device 102 or the body pad 1002. The healthcare provider may then remove the first pad section 120. In some situations, the healthcare provider then rolls the patient 1400 into the desired position (e.g., onto their back, stomach, side, etc.) such that the patient 1400 is laying entirely on the top surface 112 of the inflatable device 102 or the body pad 1002. In some embodiments, there is a microclimate body pad (e.g., the body pad 1002) under the high-friction pad 104 which is revealed after removal of the high-friction pad 104, or a portion thereof, and therefore is under the patient without separately positioning the body pad. Furthermore, after removal of the high-friction pad 104 (or a portion thereof), the inflatable device 102 or the body pad 1002 may be used to transfer the patient 1400 from a first support structure 100 to another support structure 100, as discussed above with regard to FIG. 1. The processes described in FIGS. 17-18 may be completed in sequence, individually, or in combination with any of the other processes described herein.

All of some of the components described in the patient positioning system 50 may be provided in a kit, which may be in a pre-packaged arrangement. For example, the inflatable device 102 (deflated), the high-friction pad 104, and the body pad 1002 may be provided in a pre-folded arrangement or assembly, with the high-friction pad 104 positioned on the top surface 112 of the inflatable device 102 (with the body pad 1002 positioned in between) in approximately the same position the components would be positioned in use. In this regard, the inflatable device 102, the body pad 1002, and the high-friction pad 104 may be pre-folded to form the pre-folded assembly. This pre-folded assembly can be unfolded when placed on the support structure 100 or beneath the patient 1400. For example, the pre-folded inflatable device 102, the body pad 1002, and the high-friction pad 104 may be unfolded together on the support structure 100 in order to facilitate positioning a patient in the patient positioning system 50. Additionally, the inflatable device 102, the body pad 1002, and the high-friction pad 104 may be packaged together by wrapping with a packaging material to form a package, and may be placed in the pre-folded assembly before packaging. It should be understood that in other embodiments, different folding patterns are used and/or other packaging arrangements are used.

In another embodiment, the high-friction pad 104 of the patient positioning system 50 may be provided in a kit, which may be in a pre-packaged arrangement. For example, the high-friction pad 104 and its components (e.g., the arm wraps 126, the straps 130, etc.) may be provided in a pre-folded arrangement or assembly. This pre-folded assembly can be unfolded when placed on the inflatable device 102, the body pad 1002, the support structure 100, and/or beneath the patient 1400. The high-friction pad 104 and its components may be packaged together, by wrapping with a packaging material to form a package, and may be placed in the pre-folded assembly before packaging. It should be understood that in other embodiments, different folding patterns are used and/or other packaging arrangements are used.

Though the aforementioned patient positioning system 50, and all the components described herein, are intended for single use and then disposal, the patient positioning system 50 (and any of the components described herein) may be reprocessed. Reprocessing of the patient positioning system 50 (and/or components described herein) may include a plurality of steps, for example inspecting the system, removing foreign particles, stains, or odors by cleaning or sterilizing one or more surfaces of the system, repairing tears or damage to components of the system, replacing one or more components of the system, replacing missing items from the kit, etc. Further, reprocessing may also include decontaminating (e.g., cleaning, sterilizing, etc.) the patient positioning system 50 and/or any of the components described herein (e.g., the support structure 100, the inflatable device 102, the high-friction pad 104, the body pad 1002, etc.), for example by sterilization means, such as the use of gamma radiation, electron-beam radiation, X-ray radiation, Ethylene oxide (EtO), steam, such as through the use of an autoclave, or any combination thereof.

According to an exemplary embodiment, the reprocessing process for the patient positioning system 50 includes removing the high-friction pad 104 from the inflatable device 102, at least one of cleaning or sterilizing the inflatable device 102, and providing a replacement for at least one component of the patient positioning system 50. For example, the process may include cleaning or sterilizing the top surface 112 of the inflatable device 102, and/or providing a second high-friction pad 104 to replace the first high-friction pad 104. In other embodiments, providing a replacement component of the patient positioning system 50 includes providing a second inflatable device 102 (e.g., to replace the first inflatable device 102), a second body pad 1002 (e.g., to replace the first body pad 1002), a second chest strap 1300 (e.g., to replace the first chest strap 1300), and/or any other suitable component of the patient positioning system 50. According to an exemplary embodiment, the reprocessing process also includes securing the second high-friction pad 104 to the inflatable device 102. In other embodiments, the reprocessing process includes securing other replacement components (e.g., the inflatable device 102, the body pad 1002, the chest strap 1300, etc.) to other components of the patient positioning system 50 (e.g., the support structure 100, the inflatable device 102, the high-friction pad 104, an external rail, etc.).

In an exemplary embodiment, the reprocessing process also includes repairing a component of the patient positioning system 50. Repairing may include, for example re-coupling (e.g., via an adhesive, fastener, etc.), re-stitching, re-sealing, re-surfacing, and/or any other suitable restoration process configured to repair a component of the patient positioning system 50. In an exemplary embodiment, the process includes repairing a component of the inflatable device 102 (e.g., the top surface 112, the bottom surface 114, the alignment line 116, the connection areas 212, the connection strips 214, the inflation ports 117, the inflation socks 106, etc.). In some embodiments, the process includes repairing a component of the high-friction pad 104. For example, the process may include repairing the top pad surface 118 and/or the bottom pad surface 119, the arm wraps 126 and/or the foam section 128, the straps 130, the stitching 132, the buckles 134, the arm wrap anchors 402, the counterpart fastening strip 812, and/or any other suitable component of the high-friction pad 104. In other embodiments, the process includes repairing a component of the body pad 1002 (e.g., the first z-fold 1004, the second z-fold 1006, a connection strip, etc.), the chest strap 1300 (e.g., the base portion 1302, the first end portion 1304, the second end portion 1308, etc.), and/or any other suitable component of the patient positioning system 50.

In an exemplary embodiment, the reprocessing process also includes packaging components of the patient positioning system 50 and/or replacement components. For example, the reprocessing process may include packaging the inflatable device 102 and a replacement high-friction pad 104. In some embodiments, the process includes packaging a replacement inflatable device 102, a replacement high-friction pad 104, a replacement body pad 1002, and/or a replacement chest strap 1300. In other embodiments, the process includes packaging the inflatable device 102 with one or more of a replacement inflatable device 102, a replacement high-friction pad 104, a replacement body pad 1002, and/or a replacement chest strap 1300. In yet other embodiments, the process includes packaging one or more of the inflatable device 102, the body pad 1002, and/or the chest strap 1300 with a replacement high-friction pad 104.

According to an exemplary embodiment, the reprocessing process is/includes preparing components of the patient positioning system for reuse. In an exemplary embodiment, the process of preparing the patient positioning system 50 for reuse includes obtaining a used inflatable device 102, the inflatable device 102 having at least one connection mechanism for coupling to the high-friction pad 104, and providing a replacement high-friction pad 104 to replace the original high-friction pad 104 that was used with the inflatable device 102. In an exemplary embodiment, the at least one connection mechanism is a loop fastener; however, in other embodiments the at least one connection mechanism is another suitable fastener (e.g., a hook fastener, an adhesive, a strap, etc.). According to an exemplary embodiment, the replacement high-friction pad 104 includes a hook fastener configured to couple the loop fastener of the inflatable device 102. In other embodiments, the replacement high-friction pad 104 includes another fastener (e.g., a loop fastener, an adhesive, a strap, a buckle, etc.) configured to couple the inflatable device 102.

In an exemplary embodiment, preparing components of the patient positioning system 50 for reuse includes obtaining a used component of the patient positioning system 50 and/or providing a replacement component. For example, the process may include obtaining a used support surface 100, and proving a replacement inflatable device 102, a replacement high-friction pad 104, a replacement body pad 1002, a replacement chest strap 1300, and/or another suitable component of the patient positioning system. In some embodiments, the process includes obtaining a used inflatable device 102, and providing a replacement body pad 1002. In other embodiments, the process includes obtaining a used inflatable device 102 and a used body pad 1002, and providing a replacement high-friction pad 104. As discussed above, in some embodiments the inflatable device 102 (and/or the replacement inflatable device 102), the high-friction pad 104 (and/or the replacement high-friction pad 104), and/or the body pad 1002 (and/or the replacement body pad 1002) include one or more fasteners. For example, the inflatable device 102 may include a fastener for coupling to a fastener of the body pad 1002 (and/or the replacement body pad 1002) and/or a fastener of the high-friction pad 104 (and/or the replacement high-friction pad 104). In some embodiments, the body pad 1002 (and/or replacement body pad 1002) includes a first fastener for coupling to a fastener of the inflatable device 102, and a second fastener for coupling to a fastener of the high-friction pad 104 (and/or the replacement high-friction pad 104). In other embodiments, the high-friction pad 104 includes a fastener for coupling to a fastener of the body pad 1002 (and/or the replacement body pad 1002). According to an exemplary embodiment, the process of preparing the patient positioning system 50 for reuse includes coupling one or more of the fasteners discussed above in order to couple used and/or replacement components of the patient positioning system 50. It should be understood that the reprocessing process described herein may include additional, fewer, and/or different steps.

As utilized herein with respect to numerical ranges, the terms “approximately,” “about,” “substantially,” and similar terms generally mean +/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the high-friction pad 104 of the exemplary embodiment described in at least FIGS. 5-8 may be incorporated in the patient positioning system 50 of the exemplary embodiment described in at least FIG. 1. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for reprocessing a patient positioning system, the patient positioning system comprising an inflatable device and a high-friction pad configured to attach to the inflatable device, the high-friction pad including at least one arm wrap formed of a first material, the at least one arm wrap comprising a first section and a second section, wherein a foam section is coupled to the first material in the first section and the first material is exposed in the second section, the foam section being configured to removably engage an arm of a patient, the method comprising:

removing the high-friction pad from the inflatable device by:

removing a first portion of the high-friction pad from the inflatable device, and after removing the first portion from the inflatable device, removing a second portion of the high-friction pad from the inflatable device;

at least one of cleaning or sterilizing the inflatable device after removing the high-friction pad from the inflatable device; and providing a replacement for at least one component of the patient positioning system after at least one of cleaning or sterilizing the inflatable device.

2. The method of claim 1, wherein providing the replacement for the at least one component of the patient positioning system comprises providing a second high-friction pad to replace the high-friction pad.

3. The method of claim 2, further comprising securing the second high-friction pad to the inflatable device.

4. The method of claim 2, further comprising packaging the second high-friction pad and the inflatable device.

5. The method of claim 1, further comprising repairing a component of the patient positioning system.

6. The method of claim 5, wherein repairing the component of the patient positioning system comprises repairing the inflatable device.

7. The method of claim 1, wherein the high-friction pad is made of at least one of open cell foam or gel impregnated polyether foam.

8. The method of claim 1, wherein the at least one arm wrap extends from a lateral edge of the high-friction pad, wherein the first section is positioned toward the high-friction pad and the second section is positioned away from the high-friction pad, and wherein the at least one arm wrap includes a fastening strip configured to removably couple a counterpart fastening strip of the high-friction pad.

9. The method of claim 8, wherein the foam section is laterally spaced from the lateral edge of the high-friction pad and is configured to removably engage an arm of the patient.

10. The method of claim 1, wherein providing the replacement for the at least one component of the patient positioning system comprises providing a second high-friction pad to replace the high-friction pad.

11. The method of claim 10, further comprising securing the second high-friction pad to the inflatable device.

12. The method of claim 11, wherein:

removing the high-friction pad from the inflatable device comprises decoupling the high-friction pad from a fastener of the inflatable device; and securing the second high-friction pad to the inflatable device comprises coupling the second high-friction pad to the fastener.

13. The method of claim 10, further comprising packaging the second high-friction pad and the inflatable device after securing the second high-friction pad to the inflatable device.

14. The method of claim 1, wherein the at least one of cleaning or sterilizing the inflatable device is performed on a top surface of the inflatable device.

15. The method of claim 1, further comprising:

removing a body pad before the at least one of cleaning or sterilizing the inflatable device; and securing the replacement to the patient positioning system after providing the replacement;

wherein the replacement comprises a second body pad.

16. The method of claim 1, further comprising:

removing a chest strap before the at least one of cleaning or sterilizing the inflatable device; and securing the replacement to the patient positioning system after providing the replacement;

wherein the replacement comprises a second chest strap.

17. The method of claim 1, wherein removing the high-friction pad from the inflatable device further comprises separating the first portion from the second portion before removing the first portion from the inflatable device or while removing the first portion from the inflatable device.

18. The method of claim 17, wherein separating the first portion from the second portion comprises tearing the high-friction pad along a perforated separator, the perforated separator separating the first portion from the second portion.

19. The method of claim 1, wherein the first material comprises hook and loop material.

20. A method for reprocessing a patient positioning system, the patient positioning system comprising an inflatable device and a high-friction pad configured to attach to the inflatable device, the high-friction pad comprising at least one arm wrap extending from a lateral edge of the high-friction pad, wherein the at least one arm wrap is formed of a first material and defines a first section positioned toward the high-friction pad and a second section positioned away from the high-friction pad, wherein a foam section is coupled with the first material in the first section and the first material is exposed at the second section, wherein the foam section of the at least one arm wrap is configured to removably engage an arm of a patient, and wherein the at least one arm wrap includes a fastening strip configured to removably couple a counterpart fastening strip of the high-friction pad, the method comprising:

removing the high-friction pad from the inflatable device by:

removing a first portion of the high-friction pad from the inflatable device, and after removing the first portion from the inflatable device, removing a second portion of the high-friction pad from the inflatable device;

at least one of cleaning or sterilizing the inflatable device after removing the high-friction pad from the inflatable device; and providing a replacement for at least one component of the patient positioning system after at least one of cleaning or sterilizing the inflatable device.

* * * * *